US011163597B2

(12) United States Patent
Sliwa et al.

(10) Patent No.: US 11,163,597 B2
(45) Date of Patent: Nov. 2, 2021

(54) PERSISTENT GUEST AND SOFTWARE-DEFINED STORAGE IN COMPUTING FABRIC

(71) Applicants: Robert J Sliwa, Malvern, PA (US); Bryan E Thompson, Malvern, PA (US); James R Hunter, Malvern, PA (US); John A Landis, Malvern, PA (US); David A Kershner, Malvern, PA (US)

(72) Inventors: Robert J Sliwa, Malvern, PA (US); Bryan E Thompson, Malvern, PA (US); James R Hunter, Malvern, PA (US); John A Landis, Malvern, PA (US); David A Kershner, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 253 days.

(21) Appl. No.: 15/001,374

(22) Filed: Jan. 20, 2016

(65) Prior Publication Data
US 2017/0206104 A1 Jul. 20, 2017

(51) Int. Cl.
| | |
|---|---|
| G06F 9/455 | (2018.01) |
| G06F 3/06 | (2006.01) |
| G06F 12/06 | (2006.01) |
| G06F 12/1081 | (2016.01) |
| G06F 12/02 | (2006.01) |
| G06F 15/173 | (2006.01) |

(52) U.S. Cl.
CPC ........ *G06F 9/45558* (2013.01); *G06F 3/0611* (2013.01); *G06F 3/0659* (2013.01); *G06F 3/0664* (2013.01); *G06F 3/0679* (2013.01); *G06F 12/0238* (2013.01); *G06F 12/0284* (2013.01); *G06F 12/0646* (2013.01); *G06F 12/1081* (2013.01); *G06F 15/17331* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 2007/0028244 A1* | 2/2007 | Landis | G06F 9/5016 718/108 |
| 2011/0154318 A1* | 6/2011 | Oshins | G06F 9/45537 718/1 |
| 2016/0188909 A1* | 6/2016 | Zatko | G06F 21/71 726/26 |

* cited by examiner

*Primary Examiner* — Lewis A Bullock, Jr.
*Assistant Examiner* — Melissa A Headly
(74) *Attorney, Agent, or Firm* — Merchant & Gould P.C.

(57) ABSTRACT

A computing fabric includes one or more host computing platforms and a plurality of partitions instantiated across the one or more host computing platforms, each of the plurality of partitions allocated computing resources of the one or more host computing platforms. The computing fabric further includes a hypervisor installed on the one or more host computing platforms and managing interactions among the plurality of partitions. The plurality of partitions includes a persistent partition to which one or more storage devices are allocated, the persistent partition executing software loaded from a trusted storage location and executing from a non-volatile memory.

17 Claims, 18 Drawing Sheets

PERSISTENT GUEST AND SOFTWARE-DEFINED STORAGE IN COMPUTING FABRIC

BACKGROUND

Computer system virtualization allows multiple operating systems and processes to share the hardware resources of a host computer. Ideally, the system virtualization provides resource isolation so that each operating system does not realize that it is sharing resources with another operating system and does not adversely affect the execution of the other operating system. Such system virtualization enables applications including server consolidation, co-located hosting facilities, distributed web services, applications mobility, secure computing platforms, and other applications that provide for efficient use of underlying hardware resources.

Existing virtualization systems, such as those provided by VMWare and Microsoft, have developed relatively sophisticated virtualization systems that are architected as a monolithic virtualization software system that hosts each virtualized system. In other words, these virtualization systems are constructed to host each of the virtualized systems on a particular computing platform. As such, the virtualization systems or virtual machine monitors (VMMs) associate hardware resources of a particular platform with each partition. Typically, this involves sharing of resources across multiple partitions. For example, two partitions may share a same processor and memory resource (although may be separated by address ranges or otherwise maintained to ensure isolated memory management). Furthermore, two such partitions may also share input/output devices, such as keyboards, mice, printing ports, Ethernet ports, or other communications interfaces.

When computing resources of a host computer are allocated to a particular virtual partition, those resources are generally dedicated to that partition, and the partition can be exposed to other partitions via virtual local area networks (vLANs) within a computing fabric. However, such an arrangement has disadvantages. In particular, two partitions residing on the same host computer may be exposed to each other via a vLAN despite being on the same platform, and therefore may rely on I/O device-based communication interfaces (and assumptions built into the software used to communicate via those interfaces). Accordingly, communication among partitions may be less efficient than would otherwise be possible if the partitions had knowledge of operation on a common platform. Furthermore, as communication interface technologies used for networking between host computers improve, latency and bandwidth issues regarding inter-computer communications become less critical.

Additional disadvantages exist because, in traditional virtualization environments, communications among partitions and usage of resources at different partitions is heavily managed and regulated by both the operating system within the partition and the virtualization layer supporting the partition. Such communications and system resource usage spread across multiple platforms has traditionally been discouraged in existing virtualization platforms.

SUMMARY

In summary, the present disclosure relates to virtualization systems, and in particular to methods and systems for managing guest partitions and memory access mechanisms among guest partitions.

In a first aspect, a computing fabric includes one or more host computing platforms and a plurality of partitions instantiated across the one or more host computing platforms, each of the plurality of partitions allocated computing resources of the one or more host computing platforms. The computing fabric further includes a hypervisor installed on the one or more host computing platforms and managing interactions among the plurality of partitions. The plurality of partitions includes a persistent partition to which one or more storage devices are allocated, the persistent partition executing software loaded from a trusted storage location and executing from a non-volatile memory.

In a second aspect, a method of managing storage access via a hypervisor across a computing fabric is disclosed. The method includes allocating, via a hypervisor, a plurality of storage devices to a persistent partition at a host computing platform included among a plurality of host computing platforms in a computing fabric. The method also includes associating a memory range with the persistent partition, the memory range corresponding to memory space addressable by the persistent partition and representing non-volatile storage locations of the persistent partition. The method further includes executing software loaded from a trusted storage location into memory within the memory space.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
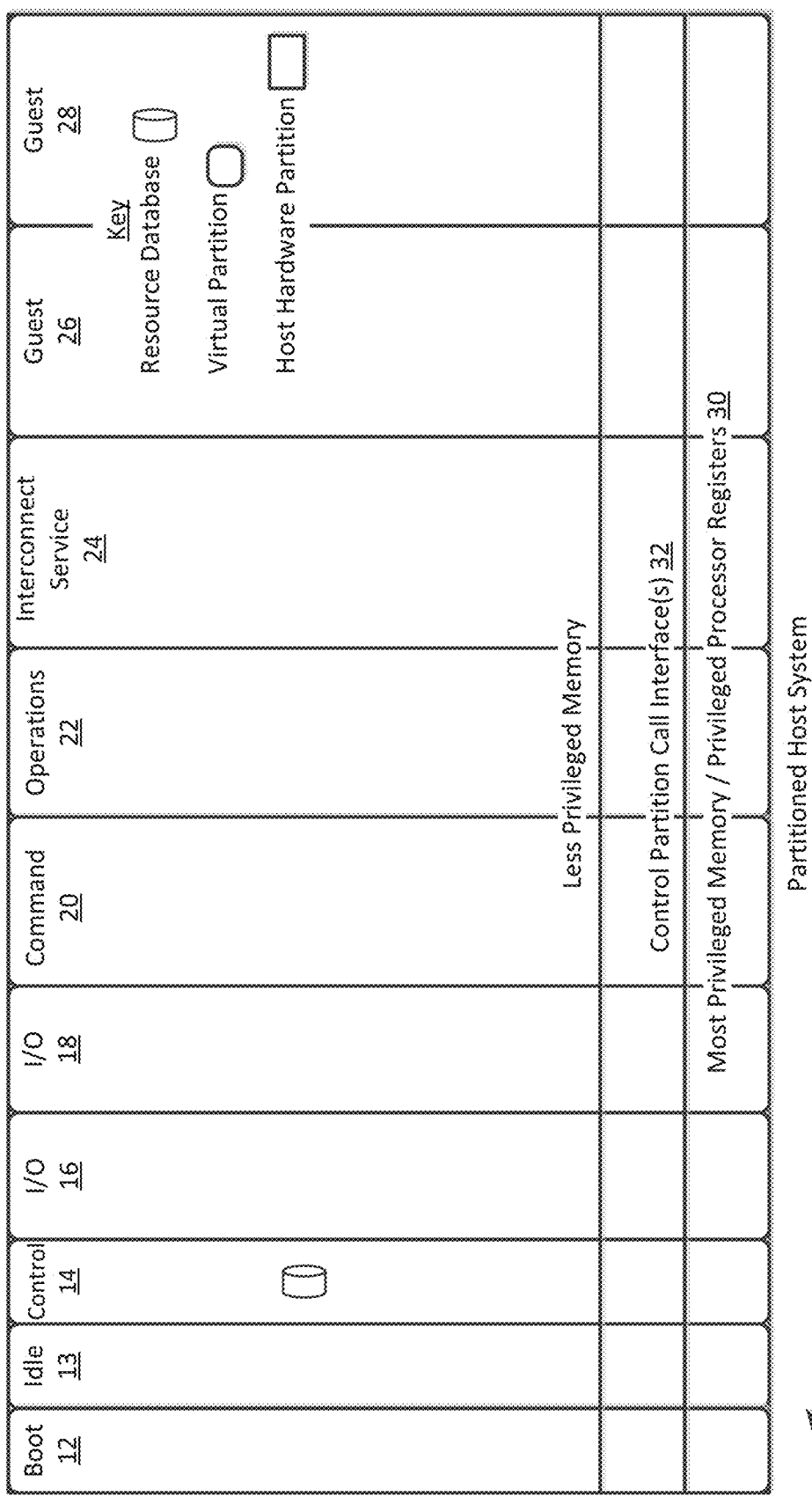
FIG. 1 illustrates system infrastructure partitions in an exemplary embodiment of a host system partitioned using the para-virtualization system of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

As briefly described above, embodiments of the present invention are directed to virtualization systems, and in particular to methods and systems for managing guest partitions and memory access mechanisms among guest partitions. In some embodiments, guest partitions can be allocated one or more storage devices, such as solid state or non-volatile memory devices, which are exposed as a particular address range. In such cases, various additional features of such a partition (in some embodiments, referred to as a persistent partition) can be implemented, such as by providing persistent, secured memory useable by that partition or other partitions hosted on the same computing platform or on different computing platforms within a network.

In various additional embodiments, encryption or other security techniques can be applied at the virtualization layer (e.g., by a hypervisor), allowing a partition having a memory resources exposed to other partitions act as a secure memory module relative to those other partitions, with that partition being exposed as having a particular address range that is managed by the hypervisor and accessible by other guest partitions via an API. Because, in some such embodiments, a hypervisor manages security but the partition maintains knowledge of the addresses that are secured (or otherwise maintained on a non-volatile device), for example via an extended page table, the hypervisor can selectively expose or enforce security policies relative to the exposed "memory" provided by such a partition based on cues provided by the partition and its allocated memory.

Furthermore, such encryption and security technologies, enforced by the virtualization layer supporting the partition, allow for various additional features to be employed, such as providing for hypervisor-enforced (and hypervisor-exposed) memory that can be accessed by guest partitions, and which is maintained in an encrypted state in a way that is obscured to the operating system of the guest partition accessing that memory included in the storage partition. Additionally, because such memory can be persisted as non-volatile, specific portions of memory can be maintained as "trusted", and can store reference versions or trusted versions of applications to be loaded by that partition or other guest partitions within the fabric. Such reference, or trusted, applications can be accessed by decryption using a key maintained by the hypervisor.

Below, and in accordance with the present disclosure, a general description of the virtualization software, and in particular an example para-virtualization platform, is disclosed in Part I. Part II discusses a particular allocation of resources of host computing systems to partitions that allow for the memory management and secured memory/secured application arrangements discussed above to be implemented. Part III discusses an arrangement in which persistent memory is provided to a guest partition in the para-virtualization platform using a secure storage partition exposed as a memory range to that guest partition. Part IV discusses various software-defined storage and memory security features with which specific storage and security implementations can be accomplished.

In the context of the present disclosure, virtualization software generally corresponds to software that executes natively on a computing system, through which non-native software can be executed by hosting that software. In such cases, the virtualization software exposes those native resources in a way that is recognizable to the non-native software. By way of reference, non-native software, otherwise referred to herein as "virtualized software" or a "virtualized system", refers to software not natively executed on a particular hardware system, for example due to it being written for execution by a different type of microprocessor configured to execute a different native instruction set. In some of the examples discussed herein, the native software set can be the x86-32, x86-64, or IA64 instruction set from Intel Corporation of Sunnyvale, Calif., while the non-native or virtualized system might be compiled for execution on an OS2200 system or an MCP-based system from Unisys Corporation of Blue Bell, Pa. However, it is understood that the principles of the present disclosure are not thereby limited; rather, non-native software simply can correspond to software not hosted or executed directly on hardware resources in the absence of a monitor system used to manage such execution, and to provide an abstraction layer between the application or workload to be executed and the underlying hardware resources.

I. Para-Virtualization System Architecture

Referring to FIG. 1, an example arrangement of a para-virtualization system is shown that can be used in implementing the features mentioned above. In some embodiments, the architecture discussed herein uses the principle of least privilege to run code at the lowest practical privilege. To do this, special infrastructure partitions run resource management and physical I/O device drivers. FIG. 1 illustrates system infrastructure partitions on the left and user guest partitions on the right. Host hardware resource management runs as a control application in a special control partition. This control application implements a server for a command channel to accept transactional requests for assignment of resources to partitions. The control application maintains the master in-memory database of the hardware resource allocations. The control application also provides a read only view of individual partitions to the associated partition monitors.

In FIG. 1, partitioned host (hardware) system (or node), shown as host computing system 10, has lesser privileged memory that is divided into distinct partitions including special infrastructure partitions such as boot partition 12, idle partition 13, control partition 14, first and second I/O partitions 16 and 18, command partition 20, operations partition 22, and interconnect service partition 24, as well as virtual guest partitions 26 and 28. As illustrated, the partitions 12-28 do not directly access the underlying privileged memory and processor registers 30 but instead accesses the privileged memory and processor registers 30 via a hypervisor system call interface 32 that provides context switches amongst the partitions 12-28 in a conventional fashion. Unlike conventional VMMs and hypervisors, however, the resource management functions of the partitioned host computing system 10 of FIG. 1 are implemented in the special infrastructure partitions 12-22. Furthermore, rather than requiring re-write of portions of the guest operating system, drivers can be provided in the guest operating system environments that can execute system calls. As explained in further detail in U.S. Pat. No. 7,984,104, assigned to Unisys Corporation of Blue Bell, Pa., these special infrastructure partitions 12-24 control resource management and physical I/O device drivers that are, in turn, used by operating systems operating as guests in the guest partitions 26-28. Of course, many other guest partitions may be implemented in a particular host computing system 10 partitioned in accordance with the techniques of the present disclosure.

A boot partition 12 contains the host boot firmware and functions to initially load the control, I/O and command partitions (elements 14-20). Once launched, the resource management "control" partition 14 includes minimal firmware that tracks resource usage using a tracking application referred to herein as a control or resource management application. Host resource management decisions are performed in command partition 20 and distributed decisions amongst partitions in one or more host computing systems 10 are managed by operations partition 22. I/O to disk drives and the like is controlled by one or both of I/O partitions 16 and 18 so as to provide both failover and load balancing capabilities. Operating systems in the guest partitions 24, 26, and 28 communicate with the I/O partitions 16 and 18 via memory channels (FIG. 3) established by the control partition 14. The partitions communicate only via the memory channels. Hardware I/O resources are allocated only to the I/O partitions 16, 18. In the configuration of FIG. 1, the hypervisor system call interface 32 is essentially reduced to context switching and containment elements (monitors) for the respective partitions.

Figure 2:
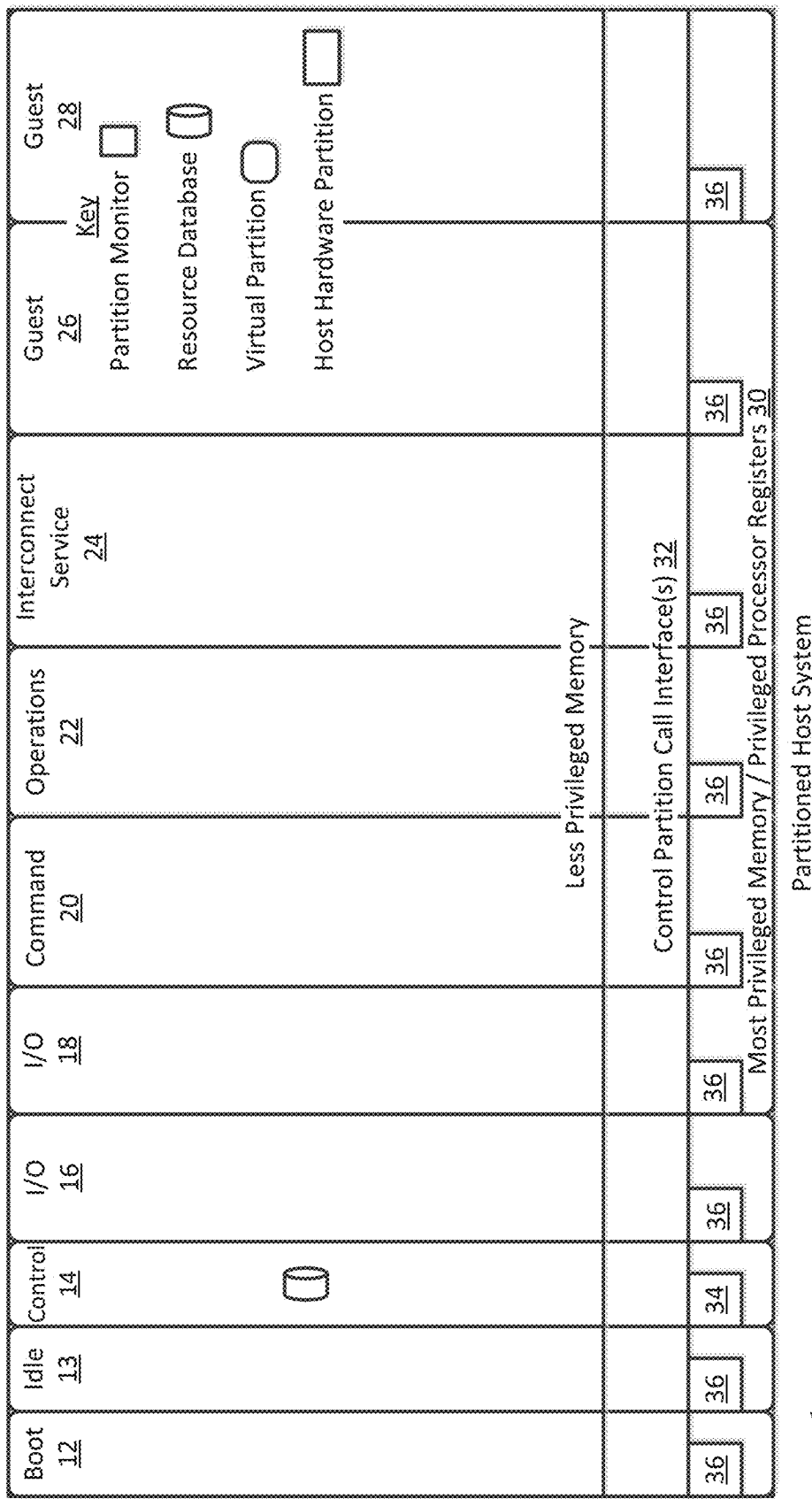
FIG. 2 illustrates the partitioned host of FIG. 1 and the associated partition monitors of each partition.
Figure 3:
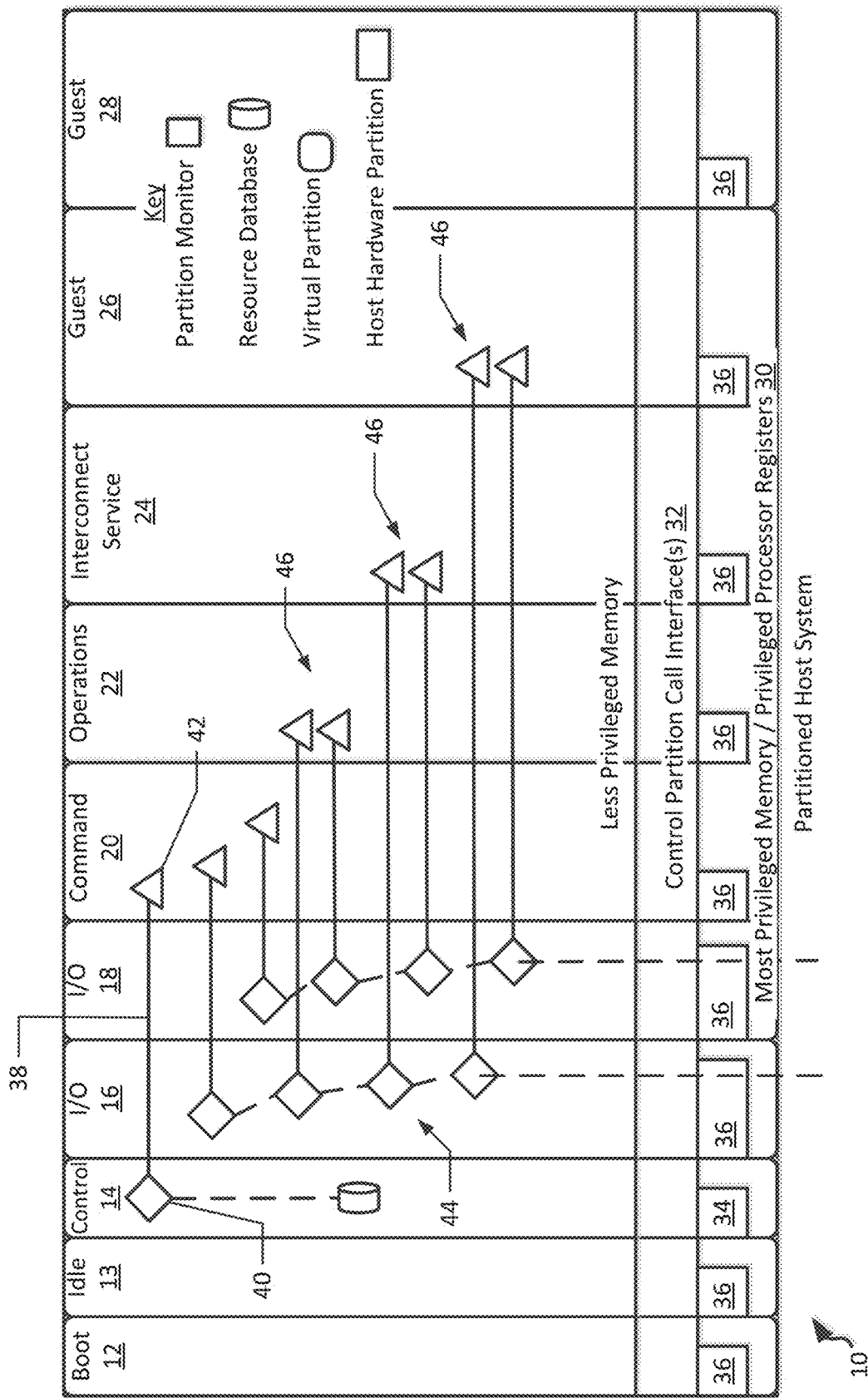
FIG. 3 illustrates memory mapped communication channels amongst various partitions of the para-virtualization system of FIG. 1.

The resource manager application of the control partition 14, shown as application 40 in FIG. 3, manages a resource database 33 that keeps track of assignment of resources to partitions and further serves a command channel 38 to accept transactional requests for assignment of the resources to respective partitions. As illustrated in FIG. 2, control partition 14 also includes a partition (lead) monitor 34 that is similar to a virtual machine monitor (VMM) except that it provides individual read-only views of the resource database in the control partition 14 to associated partition monitors 36 of each partition. Thus, unlike conventional VMMs, each partition has its own monitor 36 per vCPU of the partition such that failure of the monitor 36 does not bring down the entire host computing system 10. As will be explained below, the guest operating systems in the respective partitions 26, 28 (referred to herein as "guest partitions") are modified to access the associated partition monitors 36 that implement together with hypervisor system call interface 32 a communications mechanism through which the control, I/O, and any other special infrastructure partitions 14-24 may initiate communications with each other and with the respective guest partitions.

The partition monitors 36 in each partition constrain the guest OS and its applications to the assigned resources. Each monitor 36 implements a system call interface 32 that is used by the guest OS of its partition to request usage of allocated resources. The system call interface 32 includes protection exceptions that occur when the guest OS attempts to use privileged processor op-codes. Different partitions can use different monitors 36. This allows support of multiple system call interfaces 32 and for these standards to evolve over time. It also allows independent upgrade of monitor components in different partitions.

The monitor 36 is preferably aware of processor capabilities so that it may be optimized to utilize any available processor virtualization support. With appropriate monitor 36 and processor support, a guest OS in a guest partition (e.g., 26, 28) need not be aware of the control system of the invention and need not make any explicit 'system' calls to the monitor 36. In this case, processor virtualization interrupts provide the necessary and sufficient system call interface 32. However, to optimize performance, explicit calls from a guest OS to a monitor system call interface 32 are still desirable.

The monitor 36 also maintains a map of resources allocated to the partition it monitors and ensures that the guest OS (and applications) in its partition use only the allocated hardware resources. The monitor 36 can do this since it is the first code running in the partition at the processor's most privileged level. The monitor 36 boots the partition firmware at a decreased privilege. The firmware subsequently boots the OS and applications. Normal processor protection mechanisms prevent the firmware, OS, and applications from ever obtaining the processor's most privileged protection level.

Unlike a conventional VMM, a monitor 36 has no I/O interfaces. All I/O is performed by I/O hardware mapped to I/O partitions 16, 18 that use memory channels to communicate with their client partitions. A responsibility of a monitor 36 is instead to protect processor provided resources (e.g., processor privileged functions and memory management units). The monitor 36 also protects access to I/O hardware primarily through protection of memory mapped I/O. The monitor 36 further provides channel endpoint capabilities which are the basis for I/O capabilities between guest partitions.

The monitor 34 for the control partition 14 is a "lead" monitor with two special roles. It creates and destroys monitors 36, and also provides services to the created monitors 36 to aid processor context switches. During a processor context switch, monitors 34, 36 save the guest partition state in the virtual processor structure, save the privileged state in virtual processor structure and then invoke the control monitor switch service. This service loads the privileged state of the target partition monitor and switches to the target partition monitor which then restores the remainder of the guest partition state.

The most privileged processor level (e.g., x86 ring 0) is retained by having the monitors 34, 36 running below the system call interface 32. This is most effective if the processor implements at least three distinct protection levels: e.g., x86 ring 1, 2, and 3 available to the guest OS and applications. The control partition 14 connects to the monitors 34, 36 at the base (most privileged level) of each partition. The monitor 34 grants itself read only access to the partition descriptor in the control partition 14, and the control partition 14 has read only access to one page of monitor state stored in the resource database 33.

Those skilled in the art will appreciate that the monitors 34, 36 of the invention are similar to a classic VMM in that they constrain the partition to its assigned resources, interrupt handlers provide protection exceptions that emulate privileged behaviors as necessary, and system call interfaces are implemented for "aware" contained system code. However, as explained in further detail below, the monitors 34, 36 of the invention are unlike a classic VMM in that the master resource database 33 is contained in a virtual (control) partition for recoverability, the resource database 33 implements a simple transaction mechanism, and the virtualized system is constructed from a collection of cooperating monitors 34, 36 whereby a failure in one monitor 34, 36 need not result in failure of all partitions and need not result in the failure of a multiprocessor/multi-core partition; in particular, any symmetric multiprocessing system can, due to use of a monitor per execution core, preserve operation of the partition using remaining execution cores. Furthermore, failure of a single physical processing unit need not result in failure of all partitions of a system, since partitions are affiliated with different processing units.

The monitors 34, 36 of the invention are also different from classic VMMs in that each partition is contained by its assigned monitor(s), partitions with simpler containment requirements can use simpler and thus more reliable (and higher security) monitor implementations, and the monitor implementations for different partitions may, but need not be, shared. Also, unlike conventional VMMs, a lead monitor 34 provides access by other monitors 36 to the control partition resource database 33.

Partitions in the control environment include the available resources organized by host computing system 10. Available computing resources in a host node, also referred to herein as a host computing system are described by way of example in FIGS. 4-5. Generally, a partition is a software construct (that may be partially hardware assisted) that allows a hardware system platform (or hardware partition) to be "partitioned," or separated, into independent operating environments. The degree of hardware assist (e.g., physical hardware separation) is platform dependent but by definition is less than 100% (since by definition a 100% hardware assist provides hardware partitions). The hardware assist may be provided by the processor or other platform hardware features. For example, each partition may be associated with a separate processing core or cores, but may each be associated with a separate portion of the same system memory, networking resources, or other features. Or, partitions may time-share processing resources, but be associated with separate memory, networking, and/or peripheral devices. In general from the perspective of the control partition 14, a hardware partition is generally indistinguishable from a commodity hardware platform without partitioning hardware.

Unused physical processors are assigned to an 'Idle' partition 13. The idle partition 13 is the simplest partition that is assigned processor resources. It contains a virtual processor for each available physical processor, and each virtual processor executes an idle loop that contains appropriate processor instructions to minimize processor power usage. The idle virtual processors may cede time at the next control time quantum interrupt, and the monitor 36 of the idle partition 13 may switch processor context to a virtual processor in a different partition. During host bootstrap, the boot processor of the boot partition 12 boots all of the other processors into the idle partition 13.

In some embodiments, multiple control partitions 14 are also possible for large host partitions to avoid a single point of failure. Each would be responsible for resources of the appropriate portion of the host computing system 10. Resource service allocations would be partitioned in each portion of the host system 10. This allows clusters to run within a host computing system 10 (one cluster node in each zone) and still survive failure of a control partition 14.

As illustrated in FIGS. 1-3, each page of memory in a control partition-enabled host computing system 10 is owned by one of its partitions. Additionally, each hardware I/O device is mapped to one of the designated I/O partitions 16, 18. These I/O partitions 16, 18 (typically two for redundancy) run special software that allows the I/O partitions 16, 18 to run the I/O channel server applications for sharing the I/O hardware. Alternatively, for I/O partitions executing using a processor implementing Intel's VT-d technology, devices can be assigned directly to non-I/O partitions. Irrespective of the manner of association, such channel server applications include Virtual Ethernet switch (provides channel server endpoints for network channels) and virtual storage switch (provides channel server endpoints for storage channels). Unused memory and I/O resources are owned by a special 'Available' pseudo partition (not shown in figures). One such "Available" pseudo partition per node of host computing system 10 owns all resources available for allocation, and as such is tracked by resource database 33.

In the embodiments discussed herein, control partition 14 concentrates on server input/output requirements. Plug and Play operating systems function with appropriate virtual port/miniport drivers installed as boot time drivers. The hypervisor system call interface 32 may, in some embodiments, include an Extensible Firmware Interface (EFI) to provide a modern maintainable firmware environment that is used as the basis for the virtual firmware. The firmware provides standard mechanisms to access virtual Advanced Configuration and Power Interface (ACPI) tables. These tables allow operating systems to use standard mechanisms to discover and interact with the virtual hardware.

The boot partition 12 may provide certain Basic Input/Output System (BIOS) compatibility drivers if and when necessary to enable boot of operating systems that lack EFI loaders. The boot partition 12 also may provide limited support for these operating systems.

Different partitions may use different firmware implementations or different firmware versions. The firmware identified by partition policy is loaded when the partition is activated. During an upgrade of the monitor associated with the control partition, running partitions continue to use the loaded firmware, and may switch to a new version as determined by the effective partition policy the next time the partition is reactivated.

As noted above, monitors 36 provide enforcement of isolation from other partitions. The monitors 36 run at the most privileged processor level, and each partition has one or more monitors mapped into privileged address space. Each monitor 36 uses protection exceptions as necessary to monitor software within the virtual partition and to thwart any (inadvertent) attempt to reference resources not assigned to the associated virtual partition. Each monitor 36 constrains the guest OS and applications in the guest partitions 26, 28, and the lead monitor 34 constrains the resource management application in the control partition 14 and uses its access and special hypervisor system call interface 32 with the resource management application to communicate individual partition resource lists with the associated partition monitors 36.

According to some embodiments, there are two main categories of partitions in the virtualization system of the present disclosure. The 'user' partitions run guest operating systems for customer applications, and the system infrastructure partitions provide various platform infrastructure services. For reliability, the virtualization system architecture minimizes any implementation that is not contained within a partition, since a failure in one partition can be contained and need not impact other partitions.

As will be explained in more detail below, system partition, or service partition, types can include:
Boot 12
Idle 13
Control 14
Command 20
Operations 22
I/O 16, 18
Interconnect 24
Each of these types is briefly discussed below.

Boot Partition 12

The boot partition 12 has assigned thereto one virtual CPU (corresponding to a physical processing core or a fractional/timeshared part thereof), and contains the hardware partition boot firmware. It is used during recovery operations when necessary to boot and reboot the command partition 20 and the I/O partitions 16, 18. During bootstrap, the boot partition 12 reserves available memory and constructs the control partition 14 and the initial resource map in resource database 33 with all memory assigned either to the boot partition 12, the control partition 14, or the 'available' partition. The boot partition 12 initiates transactions to the resource manager application until it has also booted the command partition 20. At this point the control partition 14 is attached to the command partition 20 and accepts only its command transactions. The boot partition boot processor also initializes all additional processors to run the idle partition 13.

Idle Partition 13

In example embodiments, the idle partition 13 has one virtual CPU for each physical CPU. These virtual CPUs are used as place holders in the system's CPU schedule. If the control partition 14 or partition monitor 34 error recovery must remove a CPU/partition from the schedule, it is replaced with a reference to one of these virtual CPUs. Idle processors 'run' in the idle partition 13, rather than the control partition 14, to reduce the scope of error recovery should a hardware error occur while a hardware processor is idle. In actuality, the idle partition suspends a processor (to reduce power and cooling load) until the next virtual quantum interrupt. In typical scenarios, processors can be idle a significant fraction of time. The idle time is the current shared processor headroom in the hardware partition.

Control Partition 14

The control partition 14 owns the memory that contains the resource database 33 that stores the resource allocation maps. This includes the 'fractal' map for memory, the processor schedule, and mapped I/O hardware devices. For Peripheral Component Interconnect (PCI) I/O hardware, this map would allocate individual PCI devices, rather than require I/O partitions 16, 18 to enumerate a PCI bus. Different devices on the same PCI bus can be assigned to different I/O partitions 16, 18. A resource allocation application in the control partition 14 tracks the resources, applies transactions to the resource database 33, and is also the server for the command and control channels. The resource allocation application runs in the control partition 14 with a minimal operating environment. All state changes for the resource manager application are performed as transactions. If a processor error occurs when one of its virtual CPUs is active, any partial transactions can be rolled back. The hypervisor system call interface 32, which is responsible for virtual processor context switches and delivery of physical and virtual interrupts, does not write to the master resource maps managed by the application. It constrains itself to memory writes of memory associated with individual partitions and read only of the master resource maps in the resource database 33.

It is noted that, when multiple control partitions 14 are used, an associated command partition 20 can be provided for each. This allows the resource database 33 of a large host to be (literally) partitioned and limits the size of the largest virtual partition in the host while reducing the impact of failure of a control partition 14. Multiple control partitions 14 are recommended for (very) large host partitions, or anytime a partitioned virtualized system can contain the largest virtual partition.

Command Partition 20

In example embodiments, the command partition 20 owns the resource allocation policy for each hardware partition 10. The operating environment is, for example, XP embedded which provides a .NET Framework execution environment. Another possibility is, for example, Windows CE and the .NET Compact Framework.

The command partition 20 maintains a synchronized snapshot of the resource allocation map managed by the resource management application, and all changes to the map are transactions coordinated through the command channel 38 (FIG. 3) with the control partition 14. The resource management application implements the command channel 38 to accept transactions only from the command partition 20.

It is noted that in a multiple host hardware partition environment, a stub command partition 20 in each host 10 could simply run in the EFI environment and use an EFI application to pipe a command channel 38 from the control partition 14, through a network, to a shared remote command partition 20. However, this would have an impact on both reliability and recovery times, while providing only a modest cost advantage. Multiple command partitions 20 configured for failover are also possible, especially when multiple control partitions 14 are present. Restart of a command partition 20 occurs while other partitions remain operating with current resource assignments.

In accordance with the present disclosure, only a resource service in the command partition 20 makes requests of the resource manager application in the control partition 14. This allows actual allocations to be controlled by policy. Agents representing the partitions (and domains, as described below) participate to make the actual policy decisions. The policy service provides a mechanism for autonomous management of the virtual partitions. Standard and custom agents negotiate and cooperate on the use of physical computing resources, such as processor scheduling and memory assignments, in one or more physical host partitions. There are two cooperating services. The partition resource service is an application in the command partition 20 that is tightly coupled with the control resource manager application and provides services to a higher level policy service that runs in the operations partition 22 (described below) and is tightly coupled with (i.e. implements) a persistent partition configuration database, and is a client of the resource service. The resource service also provides monitoring services for the presentation tier. The partition resource objects are tightly controlled (e.g. administrators can not install resource agents) since the system responsiveness and reliability partially depends on them. A catastrophic failure in one of these objects impacts responsiveness while the server is restarted. Recurring catastrophic failures can prevent changes to the resource allocation.

Operations Partition 22

In some embodiments, the operations partition 22 owns the configuration policy for the domains in one or more host computing systems 10. The operations partition 22 is also where a data center operations (policy) service runs. As will be explained below, at least one host computing system 10 in a given virtual data center will have an operations partition 22. Not all host computing systems 10 run an operations partition 22. An operations partition 22 may be provided by multiple hosts in a virtual data center for load balancing and failover. The operations partition 22 does not need to run within a given hardware partition, and need not run as a virtual partition. The operating environment within the operations partition 22 can be, for example, MICROSOFT WINDOWS XP Professional or Windows Server, or analogous operating environments. This partition (cluster) can be shared across multiple hardware partitions. The configuration policy objects and ASP.NET user interface components run in the operations partition 22. These components can share a virtual partition with the command partition 20 to reduce cost for single host deployments.

For availability reasons, customization of partition resource agents is discouraged in favor of customization of policy agents. This is because a failure in a policy agent has less impact than a resource agent to the availability and responsiveness of the resource mechanisms. The policy agents make requests of the standard resource agents. The standard policy agents can also be extended with custom implementations. In simple single hardware partition installations, the services of the operations partition 22 can be hosted in the command partition 20.

The partition definition/configuration objects are intended to be a purpose of customization. The partition policy objects are clients of the resource objects. The policy service provides configuration services for the presentation tier.

The operations partition user interface components are typically integrated within the operations partition 22. An exemplary implementation may use Hypertext Markup Language (HTML) Version 4, CSS, and Jscript. The operations partition user interface is principally a web interface implemented by an ASP.NET application that interacts with the policy service. The user interface interacts directly with the Partition Policy Service and indirectly with a partition database of the operations partition 22.

A .NET smart client may also be provided in the operations partition 22 to provide a rich client interface that may interact directly with the policy and resource services to present a rich view of current (enterprise) computing resources.

A resource service in the command partition 20 selects appropriate resources and creates a transaction to assign the resources to new partitions. The transaction is sent to the control partition 14 which saves transaction request to un-cached memory as a transaction audit log entry (with before and after images). The transaction is validated and applied to the resource database 33.

An audit log tracks changes due to transactions since the last time the resource database 33 was backed up (flushed to memory), thereby allowing transactions to be rolled back without requiring the resource database 33 to be frequently flushed to memory. The successful transactions stored in the audit log since the last resource database 33 backup may be reapplied from the audit log to restart a failed partition. A resource also may be recovered that has been reserved by a completed transaction. A transaction that has not completed has reserved no resource. The audit log may be used by the resource allocation software to rollback any partially completed transaction that survived the cache. It should be noted that a transaction that has not completed would have assigned some but not all resources specified in a transaction to a partition and the rollback would undo that assignment if it survived the cache.

I/O Partitions 16, 18

In the embodiment shown, a plurality of I/O partitions 16, 18 are active on a host node 10. I/O partitions 16, 18 allow multi-path I/O from the user partitions 26-28 and allow certain types of failures in an I/O partition 16, 18 to be recovered transparently. All I/O hardware in host hardware partitions is mapped to the I/O partitions 16, 18. These partitions are typically allocated a dedicated processor to minimize latency and allow interrupt affinity with limited overhead to pend interrupts that could occur when the I/O partition 16, 18 is not the current context. The configuration for the I/O partitions 16, 18 determines whether the storage, network, and console components share virtual partitions or run in separate virtual partitions.

In example embodiments, the I/O partitions 16, 18 can include different partitions that implement different types of I/O operations. In an example embodiment, a file and storage manager service executes in a dedicated type of I/O partition.

Interconnect Service Partition 24

The interconnect service partition 24 coordinates inter-partition communication in conjunction with the control partition 14 and the command partition 20. Generally, and as discussed in further detail below, the interconnect service partition 24 defines and enforces policies relating to inter-communication of partitions defined in the command partition, and publishes an application programming interface (API) that acts as a command-based interconnect that provides the various guest partitions and I/O partitions 16, 18 intercommunication capabilities.

In some embodiments, the interconnect service partition 24 defines one or more security policies for each of the partitions included on all platforms, including the platform on which it resides. The interconnect service partition 24 implements permissions defined in such security policies to ensure that partitions intercommunicate only with those other partitions to which they are allowed to communicate. To that end, and as discussed in further detail below, the interconnect service partition 24 can define one or more security zones, each of which defining a "virtual fabric" of platforms capable of intercommunication. As such, each security zone represents a virtual network of interconnected partitions. Each virtual network defined by the interconnect service partition 24 can be configured such that partitions within the virtual fabric can intercommunicate, but partitions not included within that virtual fabric are incapable of communicating with member partitions (e.g., unless both of those partitions are part of a different virtual fabric). By defining a plurality of virtual fabrics within each system, partitions are by default untrusted, or closed, rather than trusted, or open. That is, in the absence of defined virtual fabrics, the partitions are assumed able to intercommunicate. However, with defined virtual fabrics, only those partitions defined as part of a common virtual fabric will intercommunicate, with partitions otherwise, by default, unable to communicate.

In addition, the interconnect service partition 24 defines one or more rights assignable to each virtual fabric by way of the security policy, thereby allowing each virtual fabric to have assigned a variety of types of rights or services to each partition or virtual fabric. As further discussed below, virtual fabrics including one or more guest partitions 26, 28 can be constructed in which a particular quality of service (e.g., reliability, uptime, or dedicated levels of processing and/or memory and/or bandwidth resources) is associated with a particular virtual fabric. To ensure such service uptime, one or more different or redundant partitions can be dynamically added to or subtracted from the virtual fabric.

User Partitions 26-28

The user partitions 26, 28 host the workloads that form the purpose of the virtualization system, and are described in normal domains for a user. These partitions are also sometimes referred to as "guest" partitions, in that they are visible to guests or users of the virtualization system, and as such are the partitions that a user primarily interacts with. All of the other partition types are described in the system domains and are generally kept out of view of typical users.

System Startup

When the host computing system 10 is booted, the EFI firmware is loaded first. The EFI firmware boots the operating system associated with the control partition 14. The EFI firmware uses a standard mechanism to pick the boot target. Assuming the loader is configured and selected, boot proceeds as follows.

The loader allocates almost all of available memory to prevent its use by the firmware. (It leaves a small pool to allow proper operation of the firmware.) The loader then creates the resource database's memory data structures in the allocated memory (which includes a boot command channel predefined in these initial data structures). The loader then uses the EFI executable image loader to load the control monitor 34 and monitoring application into the control partition 14. The loader also jacks the boot monitor underneath the boot partition 12 at some point before the boot loader is finished.

The loader then creates transactions to create the I/O partition 16 and command partition 20. These special boot partitions are loaded from special replicas of the master partition definitions. The command partition 20 updates these replicas as necessary. The boot loader loads the monitor, and firmware into the new partitions. At this point, the boot loader transfers boot path hardware ownership from the boot firmware to the I/O partition 16. The I/O partition 16 begins running and is ready to process I/O requests.

The loader creates transactions to create a storage channel from the command partition 20 to an I/O partition 16, and a command channel 38 from the command partition 20 to the control partition 14. At this point the boot loader sends a final command to the control partition 14 to relinquish the command channel 38 and pass control to the command partition 20. The command partition 20 begins running and is ready to initialize the resource service.

The command partition operating environment is loaded from the boot volume through the boot storage channel path. The operating environment loads the command partition's resource service application. The resource service takes ownership of the command channel 38 and obtains a snapshot of the resources from the control partition's resource database 33.

A fragment of the policy service is also running in the command partition 20. This fragment contains a replica of the infrastructure partitions assigned to this host. The policy service connects to the resource service and requests that the 'boot' partitions are started first. The resource service identifies the already running partitions. By this time, the virtual boot partition 12 is isolated and no longer running at the most privileged processor level. The virtual boot partition 12 can now connect to the I/O partition 16 as preparation to reboot the command partition 20. If all I/O partitions should fail, the virtual boot partition 12 also can connect to the control partition 14 and re-obtain the boot storage hardware. This is used to reboot the first I/O partition 16.

The boot partition 12 remains running to reboot the I/O and command partitions 16, 20 should they fail during operation. The control partition 14 implements watchdog timers to detect failures in these (as well as any other) partitions. The policy service then activates other infrastructure partitions as dictated by the current policy. This would typically start the redundant I/O partition 18.

If the present host computing system 10 is a host of an operations partition 22, operations partition 22 is also started at this time. The command partition 20 then listens for requests from the distributed operations partitions. As will be explained below, the operations partition 22 connects to command partitions 20 in this and other hosts through a network channel and network zone. In a simple single host implementation, an internal network can be used for this connection. At this point, the distributed operations partitions 22 start the remaining partitions as the current policy dictates.

All available (not allocated) memory resources are owned by the special 'available' partition. In the example of FIGS. 1 and 2, the available partition is size is zero and thus is not visible.

Referring to FIG. 3, virtual channels are the mechanism partitions use in accordance with the invention to connect to zones and to provide fast, safe, recoverable communications amongst the partitions. For example, virtual channels provide a mechanism for general I/O and special purpose client/server data communication between guest partitions 26, 28 and the I/O partitions 16, 18 in the same host. Each virtual channel provides a command and I/O queue (e.g., a page of shared memory) between two partitions. The memory for a channel is allocated and 'owned' by the guest partition 26, 28. These queues are discussed in further detail below in connection with the interconnect Application Programming Interface (API) as illustrated in FIGS. 6-9. The control partition 14 maps the channel portion of client memory into the virtual memory space of the attached server partition. The control application tracks channels with active servers to protect memory during teardown of the owner guest partition until after the server partition is disconnected from each channel. Virtual channels can be used for command, control, and boot mechanisms as well as for traditional network and storage I/O.

As shown in FIG. 3, the control partition 14 has a channel server 40 that communicates with a channel client 42 of the command partition 20 to create the command channel 38. The I/O partitions 16, 18 also include channel servers 44 for each of the virtual devices accessible by channel clients 46, such as in the operations partition 22, interconnect service partition 24, and one or all guest partitions 26, 28. Within each guest virtual partition 26, 28, a channel bus driver enumerates the virtual devices, where each virtual device is a client of a virtual channel. The dotted lines in I/O partition 16 represent the interconnects of memory channels from the command partition 20 and operations partitions 22 to the virtual Ethernet switch in the I/O partition 16 that may also provide a physical connection to the appropriate network zone. The dotted lines in I/O partition 18 represent the interconnections to a virtual storage switch. Redundant connections to the virtual Ethernet switch and virtual storage switches are not shown in FIG. 3. A dotted line in the control partition 14 from the command channel server 40 to the transactional resource database 33 shows the command channel connection to the transactional resource database 33.

A firmware channel bus (not shown) enumerates virtual boot devices. A separate bus driver tailored to the operating system enumerates these boot devices as well as runtime only devices. Except for I/O virtual partitions 16, 18, no PCI bus is present in the virtual partitions. This reduces complexity and increases the reliability of all other virtual partitions.

Virtual device drivers manage each virtual device. Virtual firmware implementations are provided for the boot devices, and operating system drivers are provided for runtime devices. The device drivers convert device requests into channel commands appropriate for the virtual device type.

Additional details regarding possible implementation details of a partitioned, para-virtualization system, including discussion of multiple are discussed in U.S. Pat. No. 7,984,104, assigned to Unisys Corporation of Blue Bell, Pa., the disclosure of which is hereby incorporated by reference in its entirety. Other example partitioning mechanisms, and additional details regarding partitioning within such a computing arrangement, are described in U.S. Provisional Patent Application No. 61/827,775, filed on May 28, 2013, as well as copending U.S. patent application Ser. No. 14/133,803 and Ser. No. 14/133,808, the disclosures of each of which are hereby incorporated by reference in their entireties.

II. Computing Systems Implementing Secure and Persistent Partitions

Figure 4:
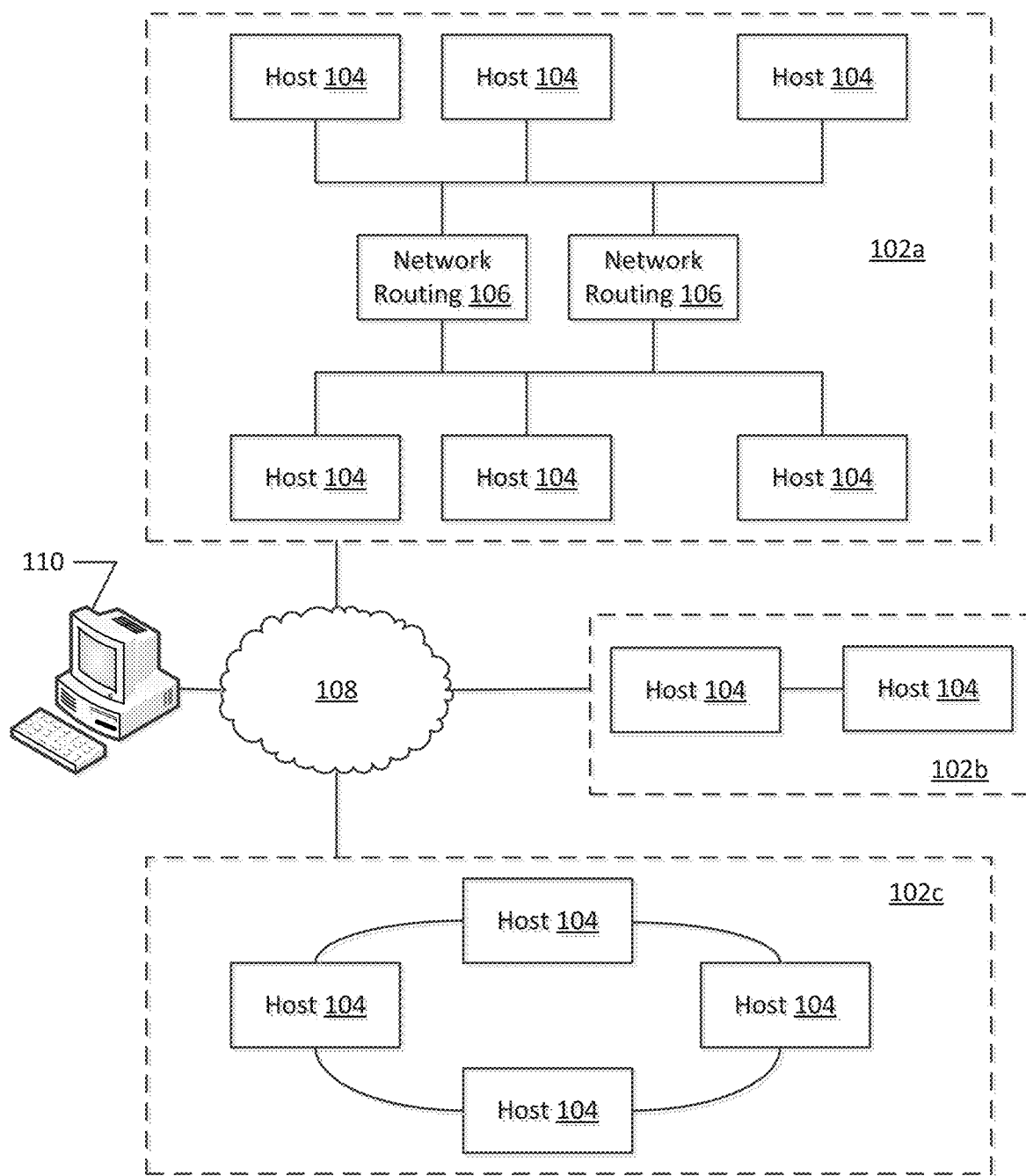
FIG. 4 illustrates a distributed multi-host system in which aspects of the present disclosure can be implemented.
Figure 5:
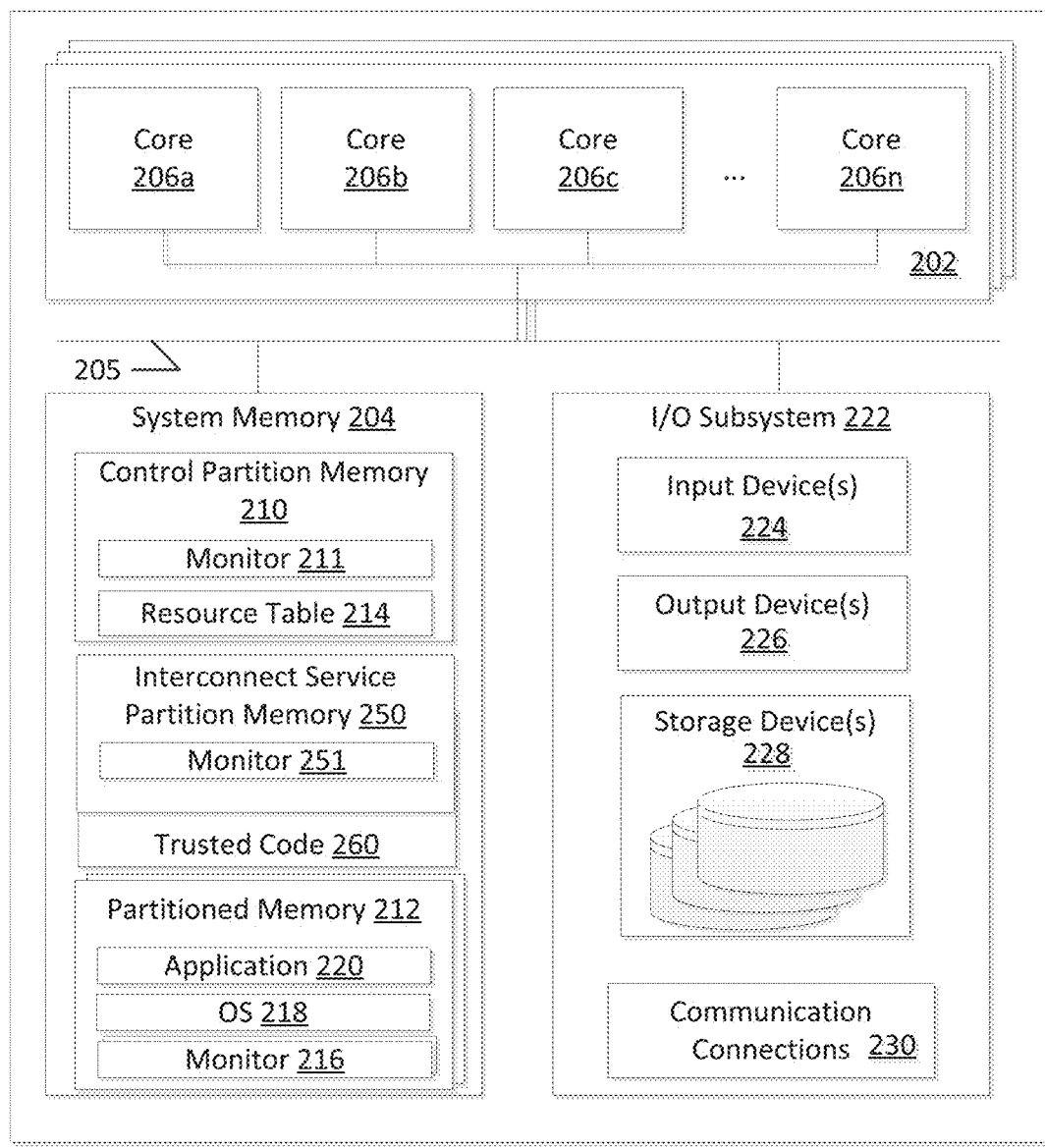
FIG. 5 illustrates an example block diagram of a host computing system useable to implement the para-virtualization systems of FIGS. 1-3, above.

Referring now to FIGS. 4-5, example arrangements of computing resources are illustrated for establishing a para-virtualization system across a plurality of host computing systems, such as host computing system s 10 of FIGS. 1-3, are shown. In particular, FIGS. 4-5 illustrate example computing resources in which the para-virtualization systems including partitions having hypervisor-enforced persistence and security described herein can be implemented.

As illustrated in FIG. 4, a system 100 in which the para-virtualization systems of the present disclosure can be implemented is shown. The system 100 is, in the embodiment shown, distributed across one or more locations 102, shown as locations 102a-c. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 102a-c each includes one or more host systems 104. The host systems 104 represent host computing systems, and can take any of a number of forms. For example, the host systems 104 can be server computing systems having one or more processing cores and memory subsystems and are useable for large-scale computing tasks. In one example embodiment, a host system 104 can be as illustrated in FIG. 5.

As illustrated in FIG. 4, a location 102 within the system 100 can be organized in a variety of ways. In the embodiment shown, a first location 102a includes network routing equipment 106, which routes communication traffic among the various hosts 104, for example in a switched network configuration. Second location 102b illustrates a peer-to-peer arrangement of host systems. Third location 102c illustrates a ring arrangement in which messages and/or data can be passed among the host computing systems themselves, which provide the routing of messages. Other types of networked arrangements could be used as well.

In various embodiments, at each location 102, the host systems 104 are interconnected by a high-speed, high-bandwidth interconnect, thereby minimizing latency due to data transfers between host systems. In an example embodiment, the interconnect can be provided by an Infiniband switched fabric communications link; in alternative embodiments, other types of interconnect technologies, such as Fibre Channel, PCI Express, Serial ATA, or other interconnect could be used as well.

Among the locations 102a-c, a variety of communication technologies can also be used to provide communicative connections of host systems 104 at different locations. For example, a packet-switched networking arrangement, such as via the Internet 108, could be used. Preferably, the interconnections among locations 102a-c are provided on a high-bandwidth connection, such as a fiber optic communication connection.

In the embodiment shown, the various host system 104 at locations 102a-c can be accessed by a client computing system 110. The client computing system can be any of a variety of desktop or mobile computing systems, such as a desktop, laptop, tablet, smartphone, or other type of user computing system. In alternative embodiments, the client computing system 110 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well, for example management services applications that are provided by a fabric service manager application.

It is noted that, in various embodiments, different arrangements of host systems 104 within the overall system 100 can be used, for example, different host systems 104 may have different numbers or types of processing cores, and different capacity and type of memory and/or caching subsystems could be implemented in different ones of the host system 104. Furthermore, one or more different types of communicative interconnect technologies might be used in the different locations 102a-c, or within a particular location.

Referring to FIG. 5, an example block diagram of a host computing system 200 useable to implement the para-virtualization systems of FIGS. 1-3, is shown. The host computing system 200 can, in some embodiments, represent an example of a host system 104 of FIG. 4, useable within the system 100. The host computing system 200 includes one or more processing subsystems 202, communicatively connected to a system memory 204. Each processing subsystem 202 can include one or more processing cores 206, shown as processing cores 206a-n. Each processing core can, in various embodiments, include one or more physical or logical processing units capable of executing computer-readable instructions. In example embodiments, the processing cores 206a-n can be implemented using any of a variety of x86 instruction sets, such as x86, x86-64, or IA64 instruction set architectures. In alternative embodiments, other instruction set architectures, such as ARM, MIPS, Power, SPARC, or other types of computing set architectures could be used.

In addition, each of the processing subsystems 202 can include one or more card-based processing subsystems including a plurality of sockets for supporting execution cores 206a-n, or alternatively can support a socket-based or mounted arrangement in which one or more execution cores are included on a single die to be mounted within the host computing system 200. Furthermore, in the embodiment shown, a plurality of processing subsystems 202 can be included in the host computing system, thereby providing a system in which one or more cores could be allocated to different partitions hosted by the same computing hardware; in alternative embodiments, a single processing subsystem including one or more processing cores 206a-n could be included in the host computing system 200, and that processing subsystem 202 could be implemented without separation from system memory 204 by a card-based implementation.

As illustrated, the system memory 204 is communicatively interconnected to the one or more processing subsystems 202 by way of a system bus 205. The system bus is largely dependent upon the architecture and memory speed support of the processing subsystems with which it is implemented; although example systems provide different frequencies and throughputs of such system buses, in general the bus system between processing subsystems 202 and the system memory is a low-latency, high bandwidth connection useable to rapidly retrieve data from the system memory 204. System memory 204 includes one or more computer storage media capable of storing data and/or instructions in a manner that provides for quick retrieval of such data and/or instructions by a corresponding processing core 206. In different embodiments, the system memory 204 is implemented in different ways. For example, the memory 204 can be implemented using various types of computer storage media.

In the embodiment shown, system memory 204 can be allocated to one or more partitions using the software described herein. In the example illustration shown, subsections of the system memory 204 can be allocated to a control partition section 210 and one or more memory partitions 212. The control partition section 210 includes a monitor 211, which in some embodiments can represent monitor 34. The control partition section 210 can also include a resource database 214 that tracks resources allocated to other partitions within the host computing system 200. This can include, for example, a listing of execution cores 206, capacity and location of system memory 204, as well as I/O devices or other types of devices associated with each partition. In example embodiments, the resource database 214 can correspond to database 33 of FIGS. 1-3.

In the embodiment shown, the system memory 204 includes memory partitions 212 which each are associated with different partitions formed within a host computing system 200. The memory partitions 212 can, in the embodiment shown, each include a monitor 216, an associated operating system 218, and one or more applications or workloads 220 to be executed within the partition. Since each memory partition 212 can be associated with one or more execution cores 206 in the resource database 214, the assigned execution cores can be used to access and execute the monitor software 216 as well as the operating system 218 and workloads 220.

It is noted that in some embodiments, the partition 212 may include multiple instances of the monitor software 216. This may be the case, for example, for partitions that have allocated thereto more than one execution core. For such cases, monitor software 216 may be allocated for and used with each execution core. Therefore, there may be more than one such monitor executing per partition, with each monitor handling various I/O, memory, or interrupt servicing tasks that may be issued with respect to that particular execution core. Each monitor supervises execution of software within a partition as allocated to a particular execution n core; accordingly, if a single partition has multiple execution cores, the operating system 218 may allocate execution of operating system tasks, or the workload(s) 220, to one or both of the execution cores. The host computing device includes an I/O subsystem 222 that includes one or more input devices 224, output devices 226, and storage devices 228. The input devices 224 can include, for example, a keyboard, a mouse, a pen, a sound input device, a touch input device, etc. Output device(s) 226 can include, for example, a display, speakers, a printer, etc. The aforementioned devices are examples and others may be used. Storage devices 228 store data and software instructions not directly accessible by the processing subsystems 202. In other words, the processing subsystems 202 perform an I/O operation to retrieve data and/or software instructions from the storage device 228. In various embodiments, the secondary storage device 228 includes various types of computer storage media. For example, the secondary storage device 228 can include one or more magnetic disks, magnetic tape drives, optical discs, solid state memory devices, and/or other types of computer storage media.

In some specific embodiments discussed herein, one or more secondary storage devices 228 can be embodied as non-volatile storage devices, such as a non-volatile (e.g., flash) mass storage device, or a set of redundant devices. In some implementations, such non-volatile storage devices can be instantiated within the overall system 200 as non-volatile DIMMs, operating as main memory storage devices rather than I/O devices. Details regarding usage of such devices are provided below.

The I/O subsystem 222 further includes one or more communication connections 230. The communication connections 230 enable the computing device 1000 to send data to and receive data from a network of one or more such devices. In different embodiments, the communication connections can be implemented in different ways. For example, the communications connections can include a network interface card implementing an Ethernet interface, a token-ring network interface, a fiber optic network interface, a wireless network interface (e.g., Wi-Fi, WiMax, etc.), or another type of network interface. The communication connections 232 can also include an inter-system communication connection for direct data communication between computing systems, such as a Infiniband switched fabric communications link, or a Fibre Channel, PCI Express, Serial ATA, or other type of direct data communication link.

It is noted that, in some embodiments of the present disclosure, other arrangements of a partition may be included as well, providing various allocations of execution cores 206, system memory 204, and I/O devices 224, 226 within the I/O subsystem 222. For example, a partition may include zero or more execution cores 206; in the event that no processor is included with the partition, the partition may lack a monitor 216, and may instead of having an executable operating system 218 may instead include a library of commands accessible to one or more services partitions, for example useable to provide I/O or memory services to those other service partitions. Furthermore, a particular partition could be allocated access to a storage device 228 or communication connections 230.

It is noted that in the present embodiment an interconnect service partition 250 and a trusted code section 260 maintained in the system memory 204. The interconnect service partition 250 maintains a monitor 251 providing virtualization services. The interconnect service partition 250 and trusted code section 260, described in further detail below in connection with FIGS. 6-17, manage exposure of computing resources across partitions, such as by exposing a memory range allocated to one partition to other partitions as a persistent memory accessible by those other partitions. Such partitioned, special-purpose memory can also be managed by the interconnect service partition 250, monitor(s) 251, and trusted code section 260 to supervise transactions in that memory range, and optionally to act on data (e.g., by encrypting/decrypting, verifying identity, or other operations) to provide increased security and reliability of the system overall.

It is noted that, in typical hypervisor arrangements, failures occurring in one execution core allocated to the partition result in failure of the partition overall, since the failure results in failure of the monitor associated with the partition. In connection with the present disclosure, partitions including multiple monitors can potentially recover from such failures by restarting the execution core and associated monitor using the remaining, correctly-executing monitor and execution core. Accordingly, the partition need not fail.

As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, DDR4 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least some tangible, non-transitory media and can, in some embodiments, exclude transitory wired or wireless signals. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as Wi-Fi, acoustic, radio frequency (RF), infrared, and other wireless media. In accordance with the present disclosure, the term computer readable media as used herein may include computer storage media, but generally excludes entirely transitory embodiments of communication media, such as modulated data signals.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIGS. 4-5 may be integrated onto a single integrated circuit. Such an SOC device may include one or more processing units, graphics units, communications units, system virtualization units and various application functionality all of which are integrated (or "burned") onto the chip substrate as a single integrated circuit. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Although particular features are discussed herein as included within a host computing system 200, it is recognized that in certain embodiments not all such components or features may be included within a computing device executing according to the methods and systems of the present disclosure. Furthermore, different types of hardware and/or software systems could be incorporated into such an electronic computing device.

III. Allocation of Host Resources to Guest Partitions

Figure 6:
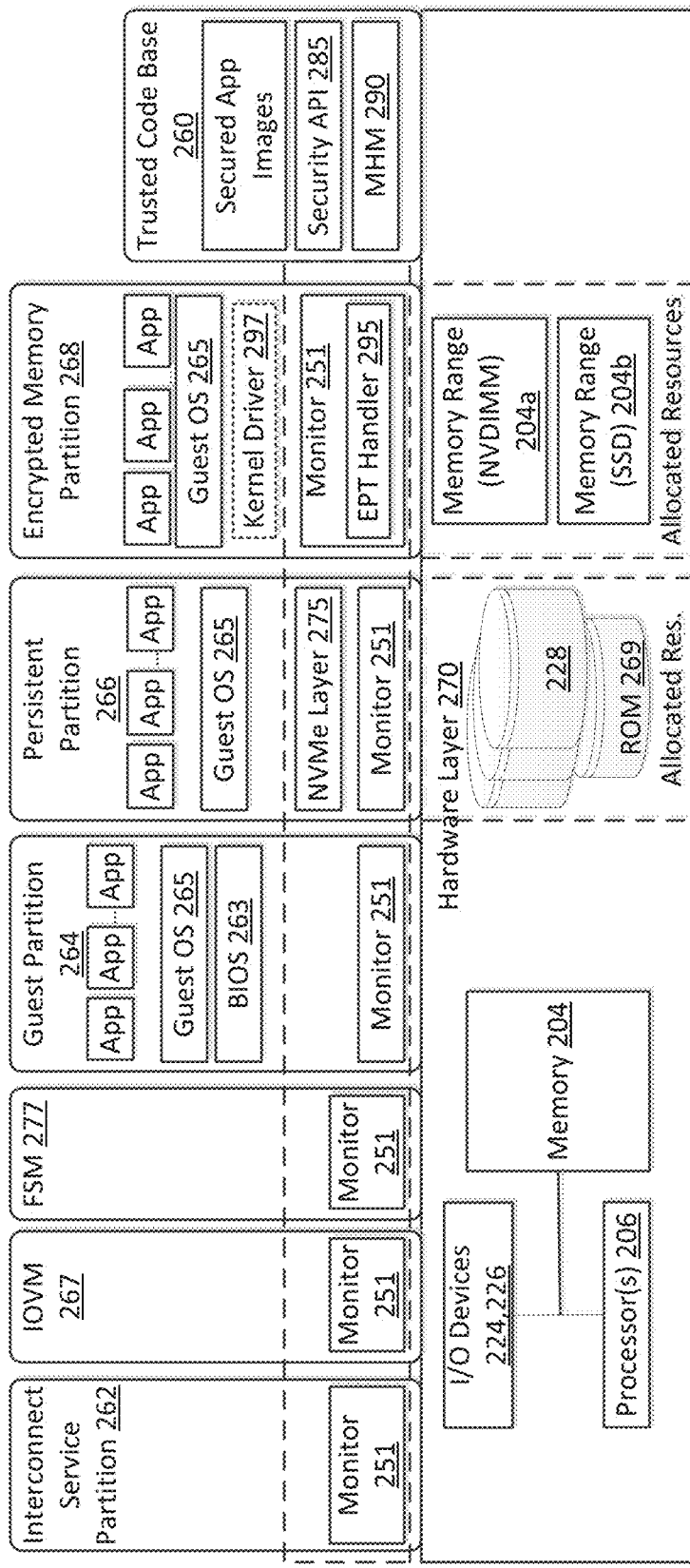
FIG. 6 illustrates an example allocation of a portion of resources of one or more host computing systems within a computing fabric to partitions managed by the para-virtualization systems described herein.

Referring now to FIG. 6, details regarding implementation of a particular arrangement of partitions are provided which represent possible arrangements in which aspects of the present disclosure can be implemented. In particular, FIG. 6 illustrates an example system 250 in which various partitions can be allocated resources from one or more host computing systems, based on which a hypervisor (including monitors and a trusted code base, as well as optional service partitions, as discussed further below).

In the embodiment shown, a plurality of partitions are hosted on a hardware layer 270. The hardware layer 270 generally represents the physical components of the computing fabric, including a plurality of processor(s) 206, memory 204, and I/O devices 224, 226. The hardware layer 270 can be implemented in any manner suitable for use within a distributed multi-partition system, for example in the same or different host systems. Any such host system as described above in connection with FIGS. 4-5 would be suitable, in connection with the present disclosure.

As noted above, such features can be included in a single host computing system, but in typical embodiments will be included among a plurality of communicatively connected host computing systems.

In the embodiment shown, the plurality of partitions includes an interconnect service partition 262, a guest partition 264, as well as a persistent partition 266, and an encrypted memory partition 268. Of course, other partitions, such as other guest partitions or service partitions, could be included as well; the present set of partitions illustrated are for purposes of illustration only. It is noted that other partitions or partition types can and typically will be executing on the hardware layer as well, for example as discussed above in connection with FIGS. 1-3 (e.g., the boot partition, idle partition, and other service partitions discussed therein).

As noted above, each of the partitions is hosted by a monitor 251, which exposes to that partition the resources of the computing fabric, and intervenes on behalf of the partition in interacting with the computing fabric. This includes, for example, allocating, to each of the partitions, one or more types of computing resources. In typical cases (and therefore not shown) a set of computing resources may be allocated to partitions including a processor 206, a dedicated portion of memory 204, and optionally an interface to one or more I/O devices. A trusted code base 260 coordinates with monitor 251 to implement a hypervisor layer between the partitions 262, 264, 266, 268 and the hardware layer 270. The trusted code base 260 can be used to perform low-level, privileged operations, and can be granted access at a very high privilege level (i.e., maximizing its right to view/modify system memory).

For purposes of illustration here, two special purpose guest partitions, the persistent partition 266 and encrypted memory partition 268, are shown. These special purpose guest partitions are designated as such, for purposes of explanation in the present disclosure, based on the resources which are allocated to those partitions.

In the example embodiment presented here, the persistent partition 266 includes one or more storage devices, such as non-volatile memory or I/O devices, which are allocated to that partition. The persistent partition 266 can also include, for example, an operating system 265 (e.g., a Windows, Linux, or Just Enough OS based operating system) to load itself into memory from a read only disk image. However, the persistent partition 266 executes entirely from non-volatile memory, such as non-volatile storage devices 228. Those storage devices are exposed to that partition by nVME layer 275. Optionally, the nVME layer 275, and therefore persistent memory, are exposed to the partition 266, and to other partitions (e.g., guest partition 264 or other persistent partitions 266). Additionally, the persistent partition 266 can be generated via an accessible API 261 that is provided by the hypervisor, for example at the trusted code base 260, and which can be called by a remote partition to instantiate a trusted process within an isolated, persistent partition.

The memory address range associated with the non-volatile memory of the persistent partition can be managed in an extended page table by the monitor 251 associated with that persistent partition 266. The persistent partition 266 will be exposed to a range of memory addresses, via the nVME layer 275, that translate to storage locations on the non-volatile storage devices 228. This can be achieved, for example by providing a device within the persistent partition 266 that exposes a range of addresses that can be mapped into the persistent partition 266 and managed via an I/O virtual machine (IOVM) 276. The IOVM 276 manages communication with the non-volatile storage devices 228 allocated to the persistent partition via a file and storage manager (FSM) partition 277 (as compared to the interconnect service partition 262, which manages interconnect communications devices). The FSM partition 277 corresponds to a specific type of I/O service partition managed by the interconnect service partition 262. When addresses within the allocated range are accessed, the device will treat what appears to the persistent partition 266 as memory operations into vNVMe requests based on the memory address range as mapped to the non-volatile storage devices 228 (e.g., SSDs), and those vNMe requests are routed to the I/O virtual machine 276 and the FSM 277 for accessing the non-volatile storage devices 228. In example embodiments, the device can either be a standard device driver, or can hook into the DMA-mapping routines of the kernel of the Guest OS 265 associated with the persistent partition 266.

In the embodiment shown, the persistent partition 266 also includes a ROM 269 from which one or more applications are loaded. Accordingly, applications executing in the persistent partition 266 are persistent, since they are loaded from ROM 269 into non-volatile memory. Additionally or alternatively, an entire guest OS 265 could be booted from the ROM 269. Failure of the persistent partition 266, therefore, will not cause loss of data stored in that partition, which would otherwise be lost when volatile memory associated with a partition is deallocated when the partition fails.

In example embodiments, the non-volatile memory associated with the persistent partition 266 can take the form of solid state storage devices (SSDs), or alternatively non-volatile dual in-line memory modules (NVM DIMMs).

In addition to trusted execution by the persistent partition 266 alone, access to such non-volatile memory can be provided to other guest partitions, including other persistent partitions. In such circumstances, a guest partition 264 can execute various software (e.g., BIOS 263, Guest Operating System 265, and applications hosted thereon). As further discussed below, because such storage devices are non-volatile, another partition, such as a guest partition, if it is exposed to the storage partition 266 via an API, can either (1) store data at the memory address range allocated to the storage partition based on such execution, or (2) load software or data directly into that memory address range. Accordingly, if guest partitions accessing non-volatile memory via the persistent partition 266 would fail for some reason, that storage may remain in operation, which may allow the guest partition to be re-instantiated and continue execution with limited interruption. Furthermore, because the address range of the persistent partition 266 can be exposed to multiple guest partitions, those other partitions can access a common, redundant non-volatile memory partition to multiple different guest partitions, even across different computing platforms. Furthermore, such persistent partitions 266 can be mirrored readily across host platforms, thereby providing for redundancy across a computing fabric if so desired. Additional details regarding usage of a persistent partition are provided below in connection with FIGS. 7-10.

Additionally in the embodiment shown, an encrypted memory partition 268 can be allocated various memory or storage devices, such as the non-volatile storage devices included in the persistent partition 266, or other types of memory. In the embodiment shown, the encrypted memory partition 268 is simply allocated a particular memory address range in memory, shown as memory 204a-b. The memory 204a-b can be, as shown, implemented as an NVDIMM 204a or a solid state storage device (SSD) 204b. The encrypted memory partition 268 generally corresponds to a guest partition having allocated a particular memory address range for which encryption can be enforced by the hypervisor, for example via the monitor 251 and trusted code base 260. Such encryption or decryption operations can be performed, for example, based on an address of a memory request received by an extended page table handler 295 hosted within the monitor 251 associated with the encrypted memory partition 268. Although illustrated only in association with the encrypted memory partition 268, it is recognized that the extended page table handler 295 can be included in any or all instantiations of monitor 251.

In some examples, the extended page table handler 295 may trigger an interrupt or fault that is handled by the monitor 251 and trusted code base 260 by performing an encryption or decryption operation for reads/writes to those memory addresses for which that trigger occurs. Based on such events, memory can remain encrypted by a mechanism not required to be exposed to software within the partition 268 itself but which manages encryption and decryption when moving data between memory and a processor cache of a processor allocated to the encrypted memory partition 268.

In example embodiments, the encrypted memory partition 268 can be validated and have contents verified during the encryption/decryption process by comparing a hash of memory contents to contents of a memory hash map (MHM) 290 that is managed by the hypervisor. As illustrated, the MHM is managed in a common trusted code base 260; however, in other embodiments, each monitor 251 can manage a memory hash map for the corresponding partition hosted by that monitor.

In some embodiments, the monitor 251 of the encrypted memory partition 268 can expose an API accessible to other partitions or to applications executing within that partition, shown as security API 285. As with the MHM 290, the security API can be hosted by the hypervisor, for example by either monitor 251 or trusted code base 260. Details regarding operation and usage of such an API are discussed in further detail below in connection with FIGS. 12-17. Using such an API and encrypted memory operations, the encrypted memory partition 268 can implement secure applications and a runtime measured execution environment in which correctness of memory is monitored, both within the partition and for RDMA-based transfers of data among partitions and host computing systems. Additional details and advantages of such an arrangement are also provided below.

In an alternative embodiment, and as further illustrated as an optional configuration in FIG. 6, a kernel-level driver 297 can be installed in the encrypted memory partition 268, and can expose an API 285 to applications within that partition. The kernel-level driver 297 can directly manage memory access operations to avoid a VMEXIT operation that would otherwise be required to the monitor 250 to do the decryption, if such a VMEXIT results in too great of performance degradation on the selected platform.

IV. Persistent Partition Setup and Operation

Referring now to FIGS. 7-10, further details regarding an example embodiment of a persistent partition are provided. In the embodiments discussed herein, a classic file system is not used for data storage, but rather all data is simply maintained in memory (i.e., not written to disk via I/O). By using large, non-volatile memories (e.g., SSDs or NVM DIMMs), such memory can be persisted within a trusted environment. Accordingly, secure partitions for existing operating systems can be created, for example useable to execute applications that run on JeOS, such as databases or webservers.

In general, a persistent guest 266 can be created and used just like any other guest partition, or it can be created and started via API from another guest partition (e.g., guest partition 264). The non-volatile memory associated with a persistent guest 266 can be implemented in two steps, for example by (1) setting up the access to non-volatile memory devices, and (2) mapping memory addresses to them.

Figure 7:
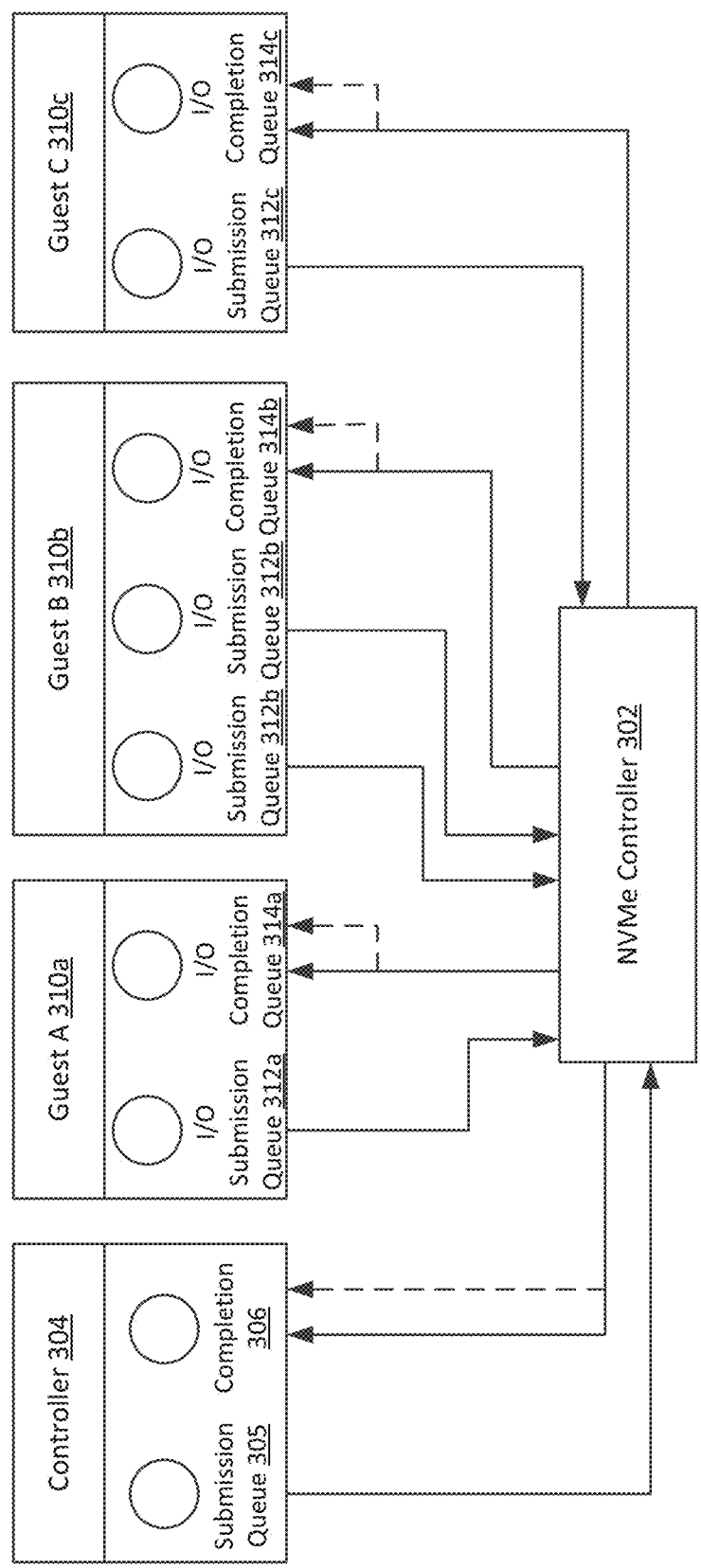
FIG. 7 illustrates an example arrangement in which I/O transactions are managed via a non-volatile memory controller implemented and managed using the para-virtualization systems described herein, according to an example embodiment of the present disclosure.

FIG. 7 illustrates an example arrangement 300 in which I/O transactions are managed via a non-volatile memory controller implemented and managed using the para-virtualization systems described herein, according to an example embodiment of the present disclosure. The arrangement 300 as illustrated represents an implementation of an IOVM, such as IOVM 276 of FIG. 6, above. In general, the arrangement includes an NVMe controller 302 in communication with one or more guest interfaces 310, shown as the plurality of guest interfaces 310a-d, as well as a controller 304. In the embodiment shown, the controller includes a submission queue 306 and a completion queue 308, and each of the guest interfaces 310a-c includes a corresponding I/O submission queue 312a-c and I/O completion queen 312a-c, respectively. Accordingly, the persistent partition 266 can communicate with the allocated non-volatile memory (e.g., SSDs or NVM DIMMs) using nVME layer 275 via IOVM 276.

Figure 8:
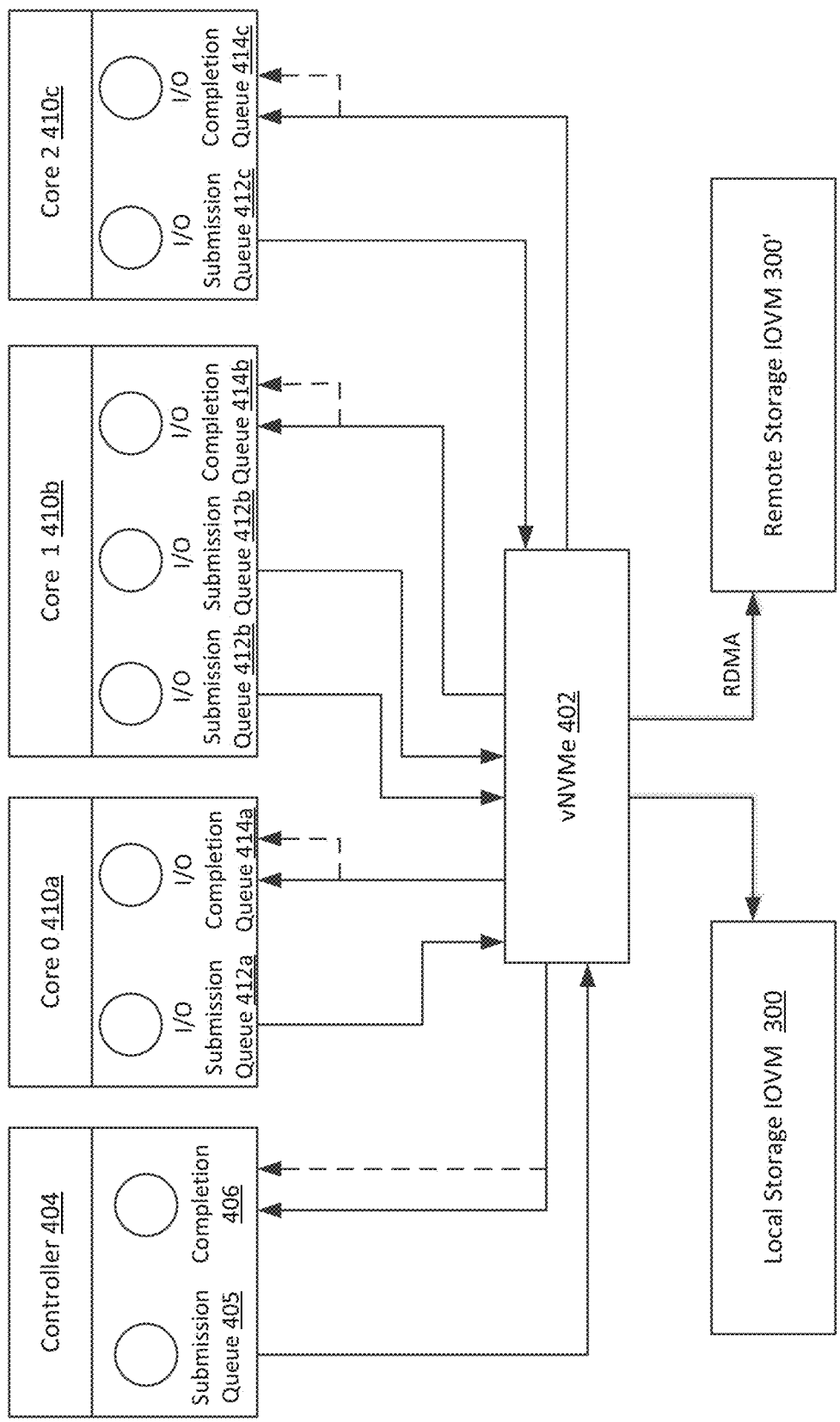
FIG. 8 illustrates an example arrangement in which I/O transactions are managed via a non-volatile memory controller implemented and managed using the para-virtualization systems described herein, which is useable across different host computing systems, according to an example embodiment of the present disclosure.

FIG. 8 illustrates an example arrangement 400 in which I/O transactions are managed via a non-volatile memory controller implemented and managed using the para-virtualization systems described herein. The arrangement can be implemented within the persistent partition 266, for example as part of an NVMe layer 275 implemented within a persistent partition.

In this arrangement, the IOVM 276 includes a virtual NVMe (vNVMe) layer 402 that is interfaced to a controller 404, as well as a plurality of cores 410a-c. The controller 404 has a submission queue 406 and a completion queue 408, and cores 410a-c correspondingly have I/O submission queues 412a-c and I/O completion queues 414a-c, respectively. These submission and completion queues represent storage operations that would otherwise be routed to an I/O device for mass storage, but instead are routed directly to non-volatile memory via the virtual NVMe layer 402 (and to FSM 277). The vNVMe layer 402 then routes such submission and completion messages to either a local IOVM 300 (as discussed above in connection with FIG. 7) and FSM 277, or a remote IOVM 300' via an RDMA-based data transfer.

It is noted that, to the extent a fabric contains a plurality of persistent partitions 266, only one such partition need implement the vNVMe layer 402, with other partitions granted access to that layer for access to non-volatile memory. Accordingly, secure applications can readily be mirrored across different persistent partitions, either on the same host computing system, or (via RDMA) across different host computing systems within the fabric.

Figure 9:
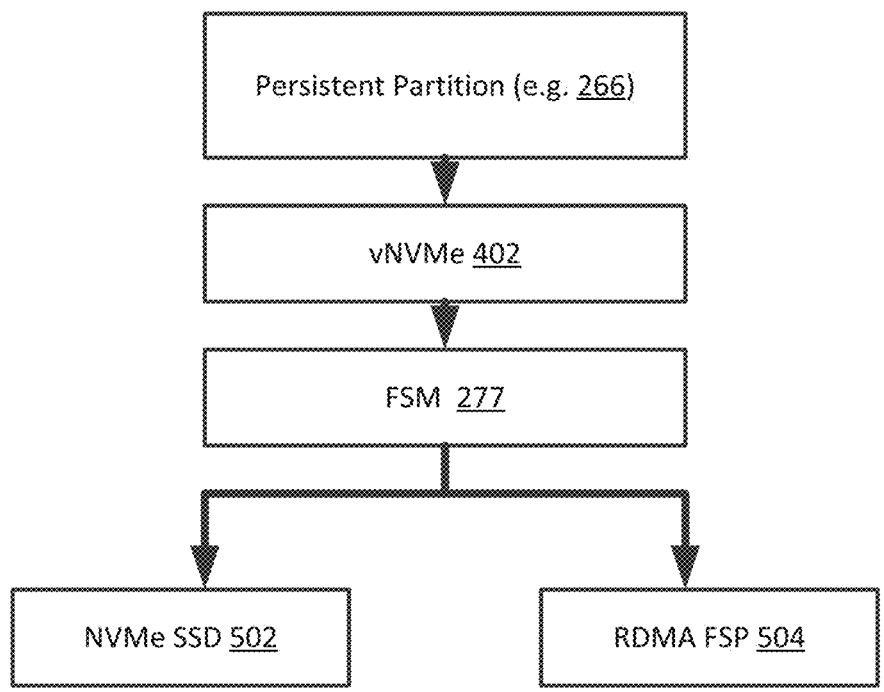
FIG. 9 illustrates an example hierarchy of partition and services supporting that partition manageable across a computing fabric using the para-virtualization systems described herein.

Referring now to FIG. 9 an example hierarchy 500 is shown, including persistent partition and services supporting that partition manageable across a computing fabric. The persistent partition 266 is implemented on a vNVMe layer 402, which communicates, via an IOVM, to the FSM 277. The FSM can then communicate directly with a local non-volatile memory (e.g., SSDs 502) or route data requests remotely to a remote FSM 504 via RDMA transfer as well. In addition, in example embodiments, the partition 266 can communicate via RDMA with one or more remote partitions, such as a remote FSM 504 or other guest partitions, as well.

Referring to FIGS. 6-9 generally, it is noted that use of the FSM 277 allows for mapping of an I/O device, such as an SSD, into memory of the persistent partition, which allows the persistent partition to persist its state. Persisted state allows the partition to be moved across the fabric either (1)

by copying memory from one platform to another, or (2) by sharing the FSM 277 via the interconnect service partition 262. Additionally, such persistent guests can readily be moved or could failover to other platforms, or distributed to allow multiple persistent guests to access a common set of non-volatile memory devices for added processing capabilities.

Referring generally to FIGS. 6-9, it is noted that although the persistent partition can be started and operated in an analogous manner to a guest partition, such a persistent partition can also can be created using an API 285 exposed to a developer, for example hosted by a management system (not shown) or within a trusted code base 260. In this case, an SDK could be used that would allow a developer to create isolated processes that execute within a persistent partition in addition to standard processes and threads APIs provided by regular guest partitions. Security API 285 also provides a secure method to communicate between the Isolated Process and the caller via secure channel. Additional details regarding the security API are discussed below.

Figure 10:
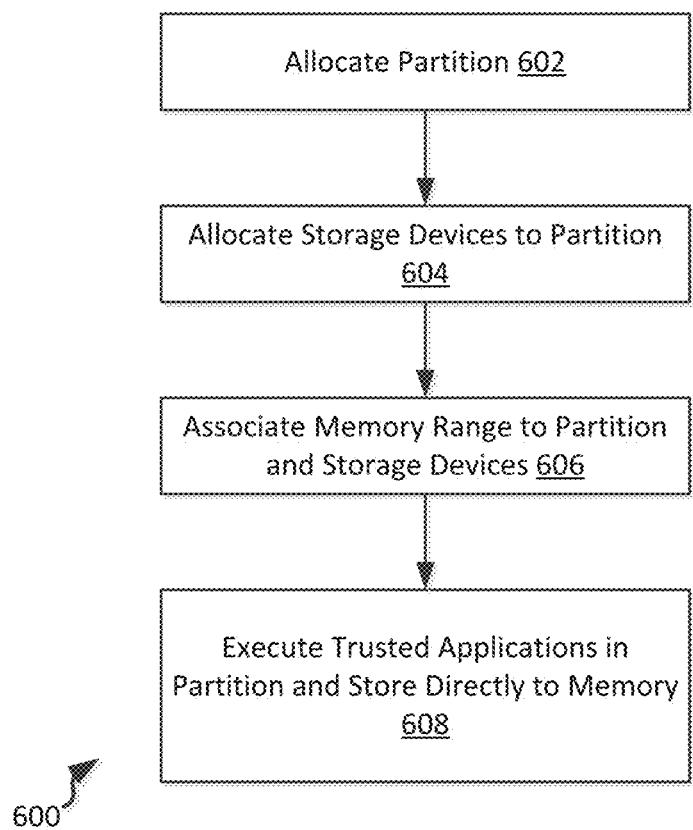
FIG. 10 illustrates a flowchart for managing persistent guest memory via a storage partition, according to an example embodiment of the present disclosure.

FIG. 10 illustrates a flowchart of a method 600 for managing persistent guest memory via a storage partition, according to an example embodiment of the present disclosure. The method 600 can be performed, for example, within a computing fabric such as is disclosed herein, and in which a persistent guest is established using non-volatile memory in place of disk storage.

In the embodiment shown, the method includes allocating a persistent partition (step 602) in a computing fabric. The allocation of the persistent partition includes allocating to that partition one or more non-volatile memory devices, such as SSDs or NVM DIMMs, as well as one or more processors capable of executing application code and optionally a read-only memory from which an operating system and one or more trusted applications can be loaded. This allocation can be made and enforced, for example, by a hypervisor, such as monitor 251 and trusted code base 260.

In some embodiments, the allocation of the persistent partition can also include allocating one or more read-only memories to the persistent partition that can include, stored thereon, one or more validated, trusted applications. When loaded for execution, the applications can be stored in non-volatile memory and validated against the content of the read-only memories, ensuring non-corrupted software is executed by the persistent partition.

In the embodiment shown, the method includes associating a memory range with the persistent partition (step 604). The memory range association can be performed, for example, by a FSM partition 277 and/or IOVM 276, as noted above, thereby allowing monitor 251 to expose to the persistent partition 266 the non-volatile memory devices as memory addresses within a particular memory address range. In example embodiments, the memory address range includes an entire memory address range allocated for storage to the persistent partition.

The method also includes executing software loaded from a trusted storage location into memory within the memory space (step 606). This can include, for example, execution of a trusted application once loaded into non-volatile memory from the read-only memory.

In example embodiments, other operations and/or steps can be included in the method. For example, if the persistent partition is called or instantiated by another partition (e.g., via an API call), the method can include processing the API call to instantiate the partition. Additionally, the method can further include receiving memory operations addressed to the memory range from a partition external from the persistent partition, in particular in cases where a persistent partition hosts a vNVMe controller that is used to manage storage for a plurality of different partitions. Other operations are possible as well, based on the above discussion of the persistent partition and the platforms on which it may be implemented.

IV. Secured Memory and Secured Application Management

Referring now to FIGS. 11-17, methods and systems for managing an encrypted memory partition 268 are discussed, in conjunction with example embodiments of the present disclosure. The methods and systems described herein allow for hypervisor-enforced memory security that can be accomplished entirely independently from either the memory-processor interface and with only minimal involvement by a hosted operating system. For example, encrypted regions of memory can reside at addresses included in a particular extended page table entry managed by the monitor associated with a particular partition; that monitor can issue a specific alert or interrupt in the event that memory location is accessed (e.g., by issuing an interrupt or other alert). Such an alert would cause the hypervisor to determine whether the accessing process has a process ID which is deemed permissible to access the data and only for permissible processes retrieve encrypted data in the memory, manage decryption of such retrieved data, and manage encryption of data to be written to memory.

Such encrypted memory regions can provide a number of advantages. For example, memory locations used by applications or databases can be encrypted. Additionally, even if a developer or system administrator fails to encrypt data residing in memory that could be accessed by hackers, the system will automatically protect it via encryption. Additionally, such self-encrypted memory regions can be used to provide a runtime measured execution environment (RMEE) that will verify the correctness of data in memory to ensure that it has not been tampered with. Secure applications can be created, which are dedicated to a particular platform, utilize secured memory, and are monitored during runtime within an RMEE. Such an arrangement will prevent unregistered programs from executing, and can also prevent execution of secured applications in an unsecured environment.

It is noted that, in some embodiments, the extended page table handler 295 described above can be used to implement aspects of this feature. In particular, the extended page table handler 295 can control access to predetermined pages of memory, and one or more monitors 251 can be used to encrypt or decrypt data stored at those memory ranges. Accordingly, a guest partition's memory range may be maintained in an encrypted state, with only the data currently in use by a processor and/or cache being decrypted. Such an arrangement is particularly advantageous in the case of non-volatile memory (e.g., for mobile devices) to avoid issues associated with cold boot attacks.

In still further embodiments, as noted above a security API 285 can be published and exposed by the hypervisor. The security API 285 can include features which allow an application to mark specific regions of memory to be encrypted. Such an arrangement allows limits to be placed on the number of times required to access a monitor, which is advantageous for performance reasons (e.g., to avoid constant monitor interruption of execution by a partition).

Figure 11:
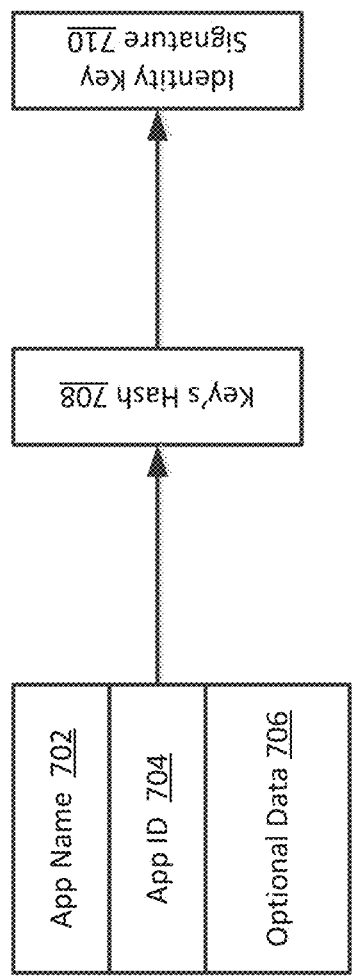
FIG. 11 illustrates generation of a secure application identity key useable to secure an application in memory according to example embodiments of the present disclosure.

Referring to FIG. 11, a block diagram of a system 700 is shown that generates a secure application identity key useable to secure an application in memory according to example embodiments of the present disclosure. The system 700 can be used, for example, to store an application securely in memory such that decryption of the application for execution is managed by the hypervisor in a way that is largely offloaded from the hosted software.

In the embodiment shown, the system 700 includes an identity key useable to secure such data. The identity key is generated from an application 702, an application identifier 704, and optional data 706 associated with the application. The identity key is created by calculating a hash 708 of the application 702, application identifier 704, and optional data 706. The hash is then encrypted using a private key, thereby creating an applications identity key digital signature 710. To access an application stored in a secured manner in memory, a monitor will add an identity key and a public encryption key to a key database for retrieval.

Figure 12:
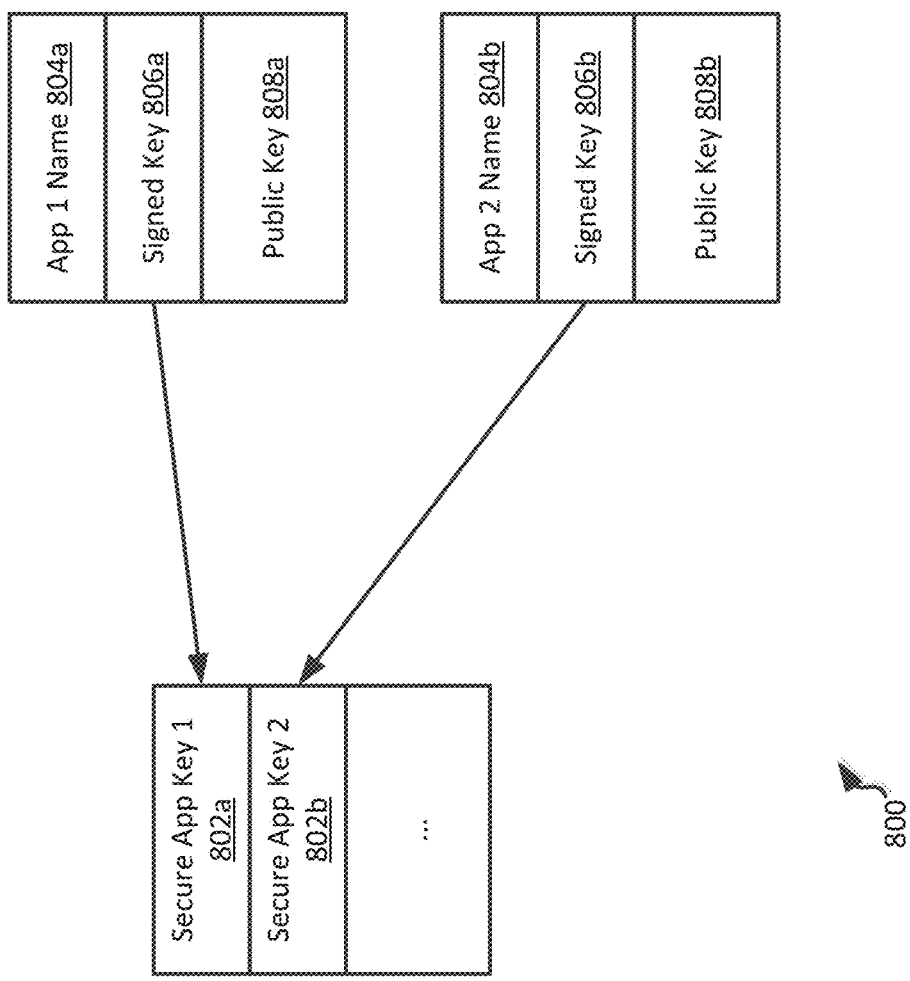
FIG. 12 illustrates a structure of a secured application identity key database useable to secure an application in memory, according to example embodiments of the present disclosure.

FIG. 12 illustrates a structure of such a secured application identity key database 800 useable to secure an application in memory, according to example embodiments of the present disclosure. In the embodiment shown, each secured application key 802, shown as applications keys 802*a-b*, are associated with an entry for that application which includes an application name 804, a signed key 806, and a public key useable in association with the signed key to decrypt the application as stored in memory. In the embodiment shown, two separate entries including an application name 804*a-b*, signed key 806*a-b*, and public key 808*a-b* are shown, but more or fewer such entries could be included as well in the secured application identity key database.

Figure 13:
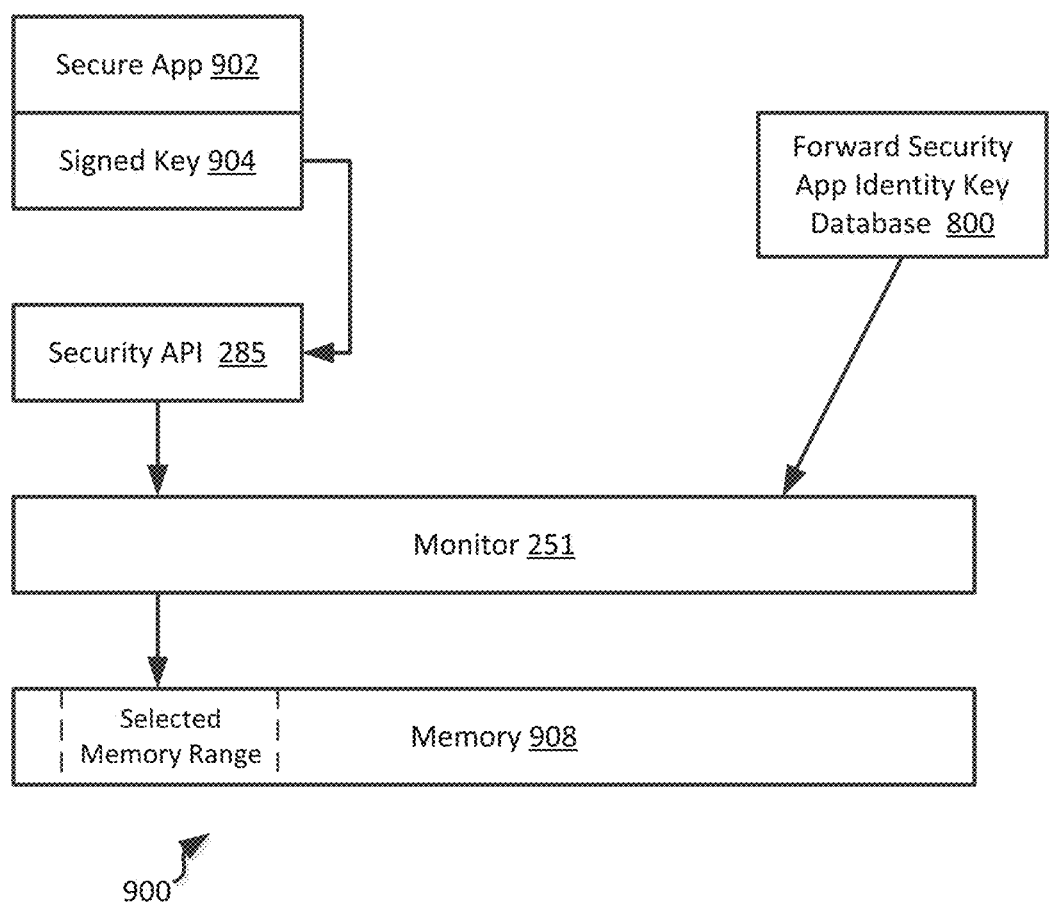
FIG. 13 illustrates an arrangement in which a secured application can use an application programming interface to ensure secured memory access, according to example embodiments of the present disclosure.

Referring to FIG. 13, an arrangement in which a secured application can use an application programming interface to ensure secured memory access is illustrated, according to example embodiments of the present disclosure. Use of such an application programming interface allows secure applications to access memory via the API, thereby managing interactions with a hypervisor and limiting those interactions to instances of a particular subrange or particular actions/action types.

In the arrangement 900 as shown, a secure application 902 and associated signed key 904 are useable to access a security API, shown as security API 285. The secure application 902 provides the signed identity key 904 to the API 285. The monitor 251 will access the secured application identity key database 800, and calculates a hash of the identity key. The monitor 251 can also use the public key in the secured application identity key database 800 to decrypt the signature provided. If the calculated hash is the same as the one decrypted, the monitor 251 allows the API call to succeed.

Generally, the security API 285 allows processes executing in a partition to be secured by isolating that process within the partition. A developer can define a partition of desired size (e.g., number of processors, memory size, I/O devices, RDMA connections, etc.) to talk to other processes and secure processes. The developer may also select specific self-encrypting memory and monitoring features.

In some embodiments, a secure process can be implemented as an encrypted memory partition having a single application executing thereon. Referring to the arrangement of encrypted memory partition 268, a guest OS 265 for such a partition could be customized JeOS (just enough operating system) that supports API calls to the security API 285, and includes features required to cooperate with the monitor 251 to allow only secure applications and/or processes to be executed.

In example embodiments of such a security API 285, the security API 285 will expose features that allow a developer to select specific ranges of memory at which self-encryption occurs. The security API 285 will control all access to the memory at those ranges, and provides calls for allocating/deallocating and read/write of specified memory ranges.

In an example implementation of the security API 285, a developer is allowed to select specific, predetermined ranges of memory for self-encryption. Such specific ranges can be, for example, an entire memory range associated with a partition, or less than the entire memory range associated with a particular partition. In the various embodiments of the security API 285, it provides calls for securely allocating/deallocating and read/write of specified memory ranges.

In example embodiments, there can be at least two different types of operations supported by the security API 285. A first type of implementation exposes allocation, write, and read operations to software executing within a partition. The allocation operation exposes a virtualization call to a monitor that marks a memory region as encrypted. This arrangement does not require monitor to validate the contents of the memory, but rather simply to encrypt data to be stored in the memory with the key known to the secure application and monitor. The write operation changes a value in memory by providing its identity key and values to write to the monitor 251. The monitor verifies the identity of the application from which the write request is received. If the application is validated, the monitor will encrypt the data and write it to the memory address in memory 908. A read operation is performed according to a standard read of memory and decryption in a user mode.

In this first example implementation, one or more guarantees of the memory regions can be made. For example, in this implementation a memory region is guaranteed to be encrypted but its contents not monitored or validated. Accordingly, a rogue program with access to the memory range could read or modify that memory. Of course, that rogue program could read the memory, but would not be able to decrypt its contents. Accordingly, read data at these rogue write locations would fail.

In a variation of the above, the write operation could instead result in the monitor creating a page fault handler for writes to an allocated memory region. If a rogue program in this case attempts to write to the secure memory, a page fault would occur, transitioning execution to the monitor. The monitor would then prevent access to the memory and take additional security measures.

In a second example implementation, similar allocation, write, and read operations can be performed. However, in this implementation, the allocation operation can include setting a flag to ask the monitor to watch for memory correctness. In such embodiments, the monitor associated with a partition will determine whether a flag is set to watch for memory correctness. If so, the monitor will create hashes for each allocated memory page and store those hashes in the memory hash map 290. The monitor will also host a custom extended page table fault handler (e.g., extended page table handler 295 of FIG. 6) to be executed during each memory read operation. In the case of a write operation, data and an application identity are provided to the monitor, which verifies the identity of the application. If the application identity is acceptable (e.g., the application is the correct application allowed to write to the secured memory), the data is encrypted and written to memory. A hash is created for the data, and the memory hash map 290 is updated with the hash value that is created. For a read operation, the application will issue a call to the API 285 which includes its identity key and the memory range for the read. The monitor 251 will verify that the key is correct, and obtain the data from memory pages at the memory range. A hash of the memory contents will be matched to the hash in the memory hash map 290 to validate the memory contents before providing them to the application executing within the guest partition. Alternatively, aspects of these features could be performed, rather than using an extended page table handler 295, using a kernel-level driver, such as driver 297 of FIG. 6. Details regarding various storage and retrieval operations performed via the API are described below in connection with FIGS. 16-18.

It is noted that using this second type of API implementation, it can be guaranteed that the specified memory region is protected by encryption, and also provides security checks preventing rogue programs from storing data at secured memory locations. This implementation also has the benefit of additional validation of memory contents when such contents are retrieved and decrypted. In addition, one or more applications can be specified as allowed to access the specific memory ranges, and can be tracked by the monitor.

Figure 14:
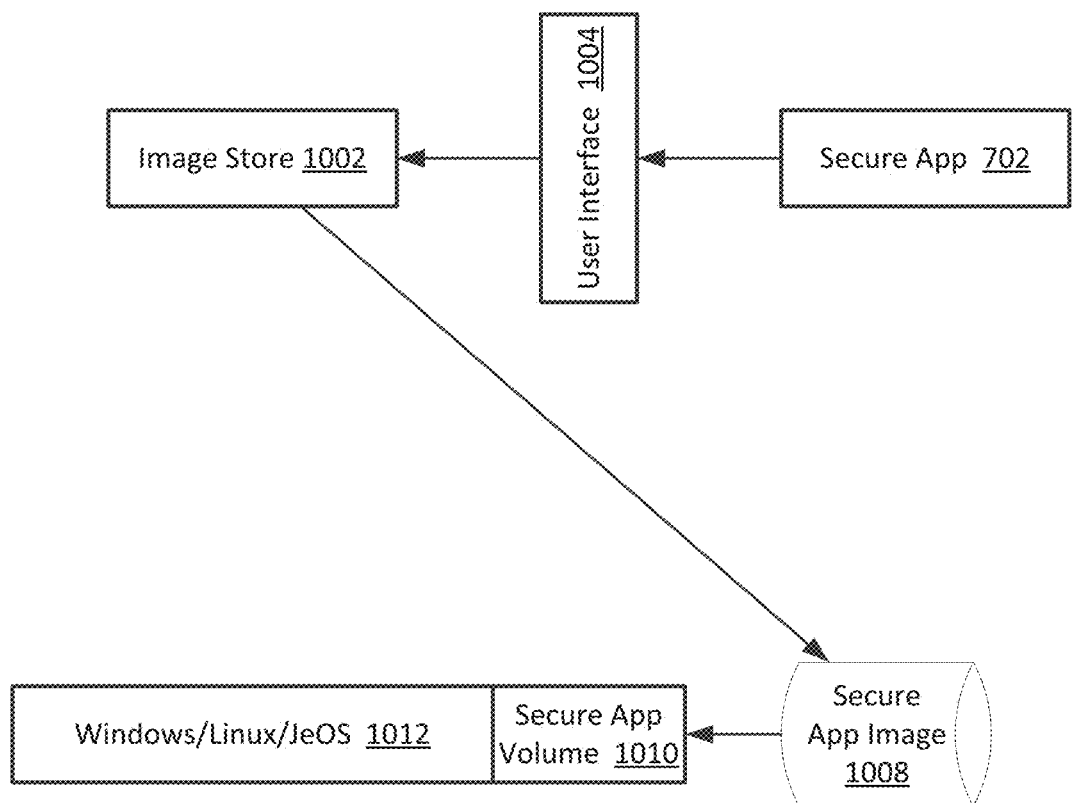
FIG. 14 illustrates an arrangement useable to securely store an application image for a secured application, according to example embodiments of the present disclosure.

Referring now to FIG. 14 an arrangement 1000 is shown that is useable to securely store an application image for a secured application, according to example embodiments of the present disclosure. The arrangement 1000 provides a system within the virtualization systems of the present disclosure in which a secure application can have a validated, stored binary, thereby avoiding tampering by unauthorized users.

In the embodiment shown, a secure application 702 is loaded into the virtualization system rather than into an operating system, and is known to the virtualization layer. For example, in example embodiments, the binary for the secure application 702 can take the form of a ROMDISK image, which forms part of the trusted computing base 260 of FIG. 6. Accordingly, the image will be validated at the time of boot of each platform hosting the trusted computing base 260. Once the ROMDISK image is available it is assigned to the guest partition on which the secure application 702 is to execute.

A user interface 1004 allows a developer to store the secure application 702 in an image store 1002 within the trusted code base 260. When executed, the secure application image is then loaded into a secure application volume 1010 alongside JeOS in the method described above.

Referring now to FIGS. 15-18, methods for allocating encrypted memory partitions, and for writing to and reading from secured memory as enforced by a hypervisor, are described. The methods described herein can be accomplished, for example, by using the secured applications and encrypted memory partition 268 described above.

Figure 15:
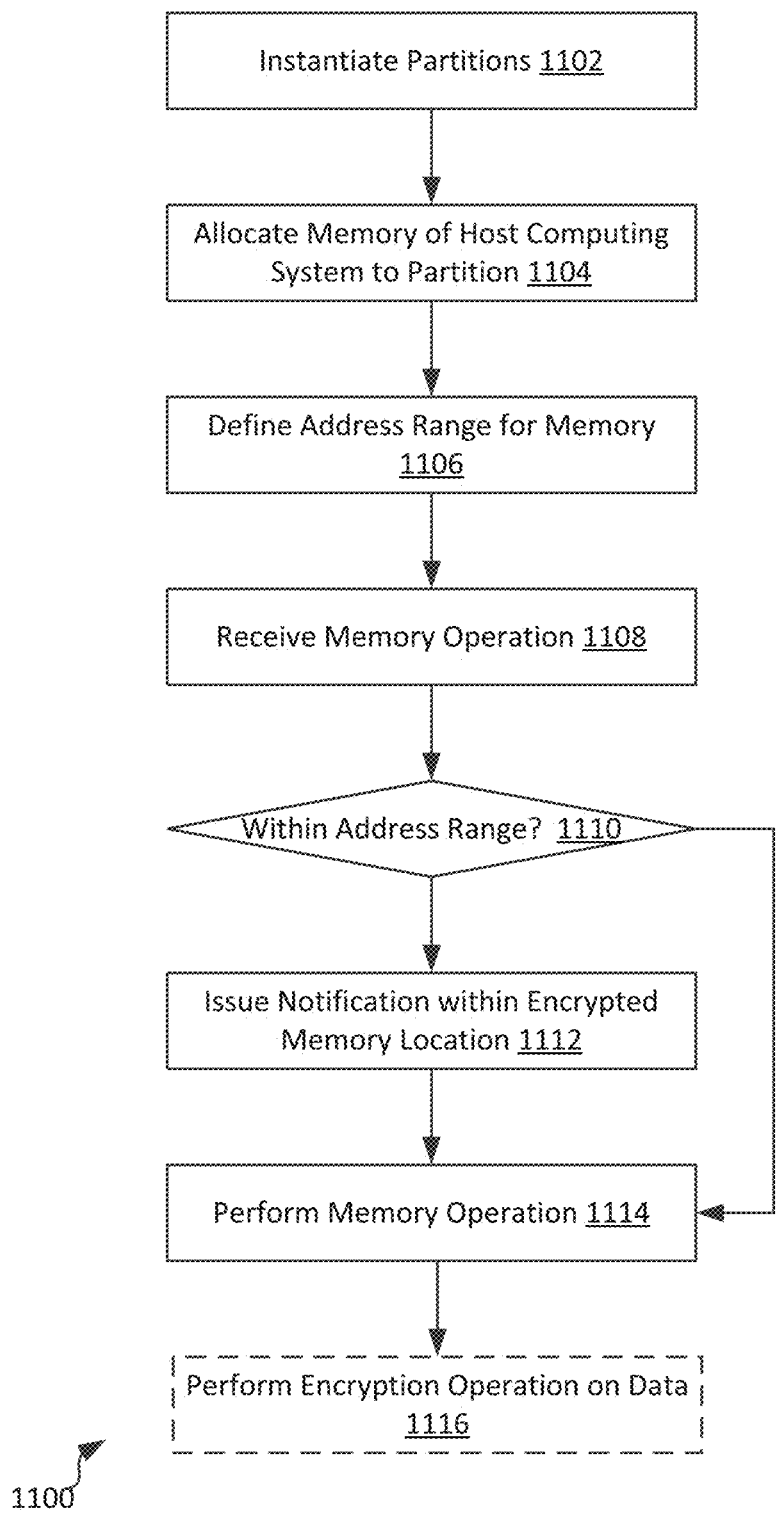
FIG. 15 illustrates a flowchart of a method for implementing a self-encrypting memory via hypervisor enforcement, according to an example embodiment.

Referring to FIG. 15, a flowchart of a method 1100 is shown for implementing a self-encrypting memory via hypervisor enforcement, according to an example embodiment. The method 1100 includes instantiating one or more partitions, including at least one encrypted memory partition, such as the encrypted memory partition 268 of FIG. 6 (step 1102). Alongside instantiation of such partitions, each instantiated partition is allocated computing resources, such as a processor core (or cores), memory, access to I/O devices, and other types of resources. In connection with the present disclosure, part of the allocation of computing resources for an encrypted memory partition 268 includes allocating a secure portion of memory in which encrypted data will be stored (step 1104). Such secure memory can correspond to RAM or non-volatile memory, such as SSD or NVDIMM type devices. In the embodiment shown, the method 1100 includes defining an address range for memory associated with the encrypted memory partition 268 (step 1106). This can include, for example, defining a specific memory page or pages that are associated with a memory resource allocated to the partition.

In example embodiments, allocating the resources to the partition and defining the address range can include making a call to an API exposed by the monitor to mark a memory region as encrypted. The allocation operation can also include setting a flag to ask the monitor to watch for memory correctness within the designated range.

In the embodiment shown, a memory operation is received (step 1108). The memory operation can be, for example, a memory read operation or a memory write operation. Generally, the memory operation is followed by a determination by the hypervisor of whether the memory operation is associated with a range that is defined to include encrypted memory (step 1110). This can include, for example determining based on a page table that the memory operation is associated with encrypted memory. If the memory operation is within the address range, a notification is issued (step 1112). The notification can be, for example a notification that the memory operation is retrieved from a particular application or type of application that is allowed to read/write from the specific location. Such a notification can include allowing the memory operation to be performed, such as by issuing a request from an extended page table handler that triggers the memory operation.

The memory operation is then performed (step 1114), and an encryption operation is performed on the data associated with the memory operation (step 1116). The encryption operation can be, for example, encryption of data received for purposes of writing to a particular memory location. It can also be decryption of data retrieved from a memory location in connection with a read operation.

Figure 16:
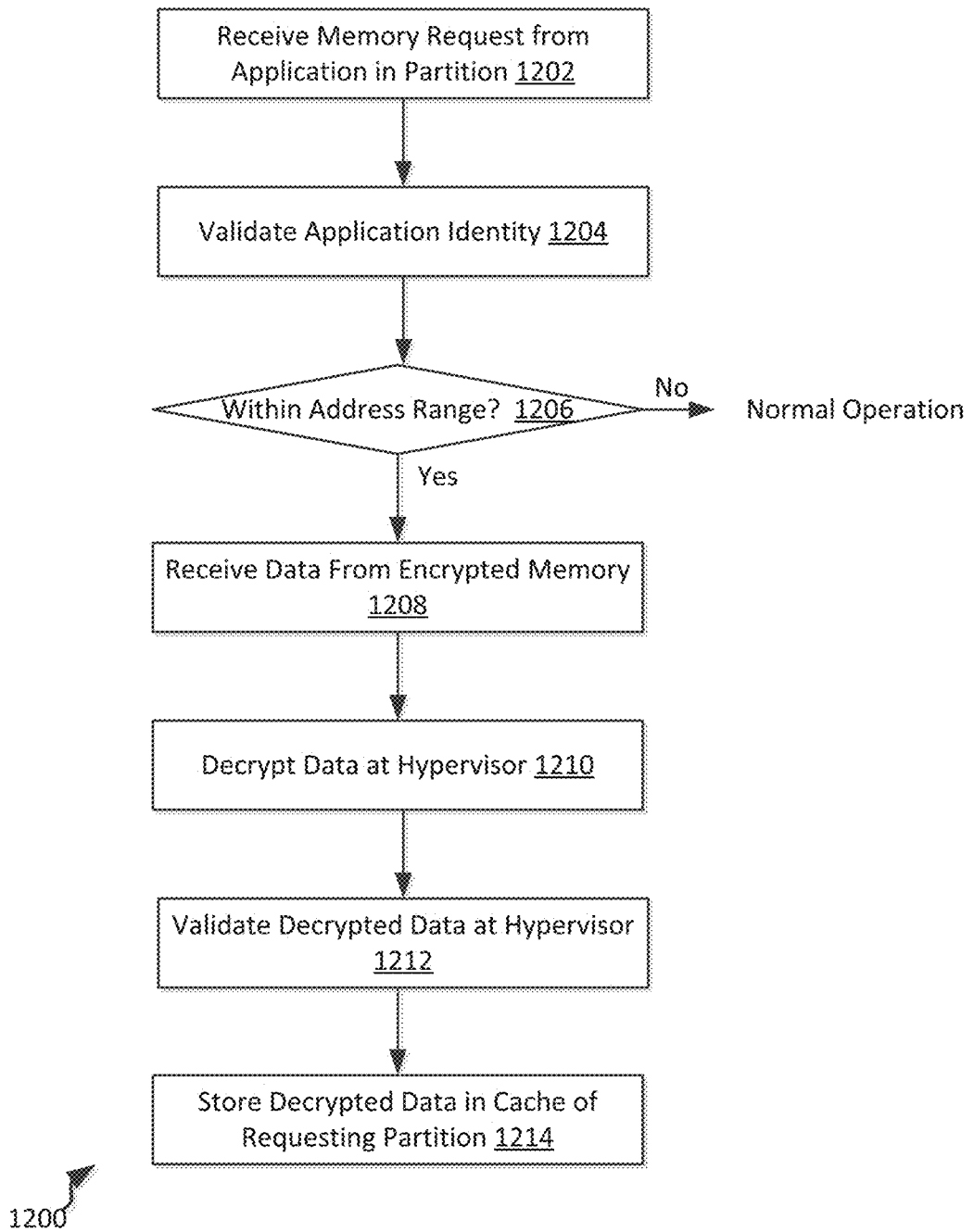
FIG. 16 illustrates a flowchart of a method for accessing secured data from a hypervisor-enforced secured memory, according to an example embodiment.
Figure 17:
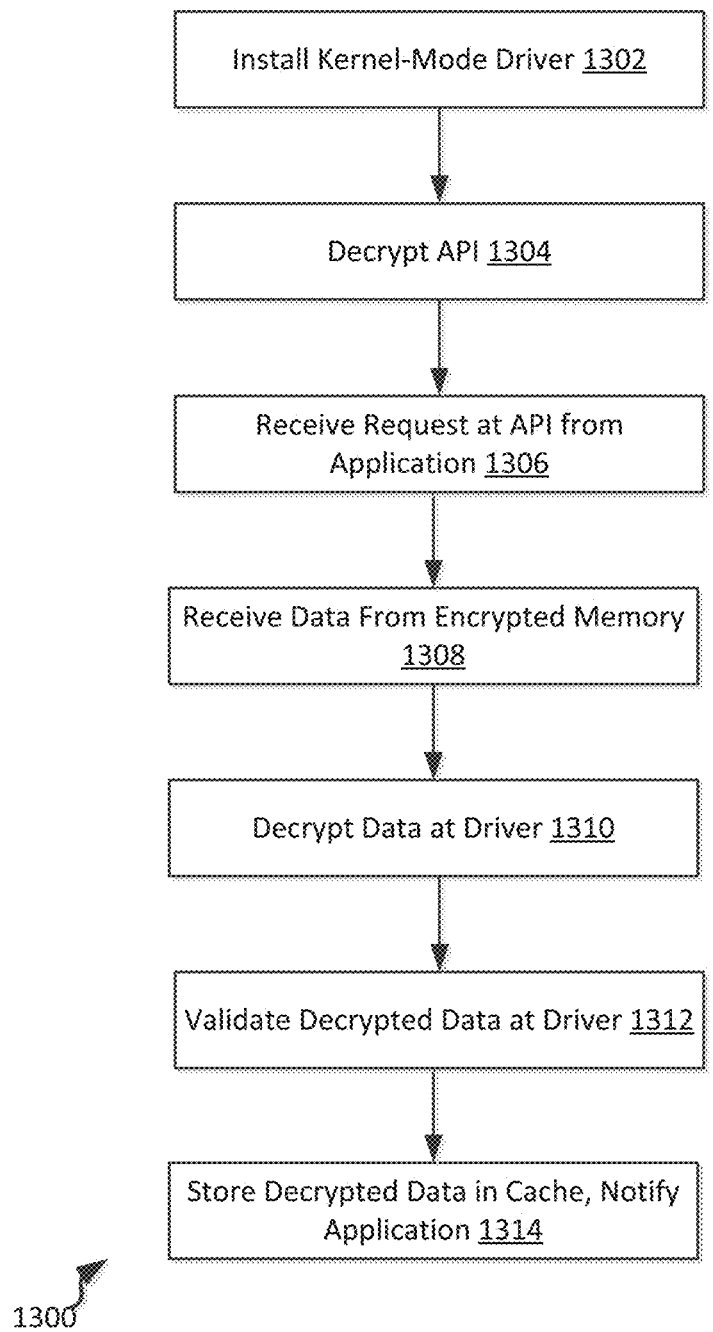
FIG. 17 illustrates a flowchart of a method for accessing secured data from a hypervisor-enforced secured memory, according to example alternative embodiment to that shown in FIG. 16.
Figure 18:
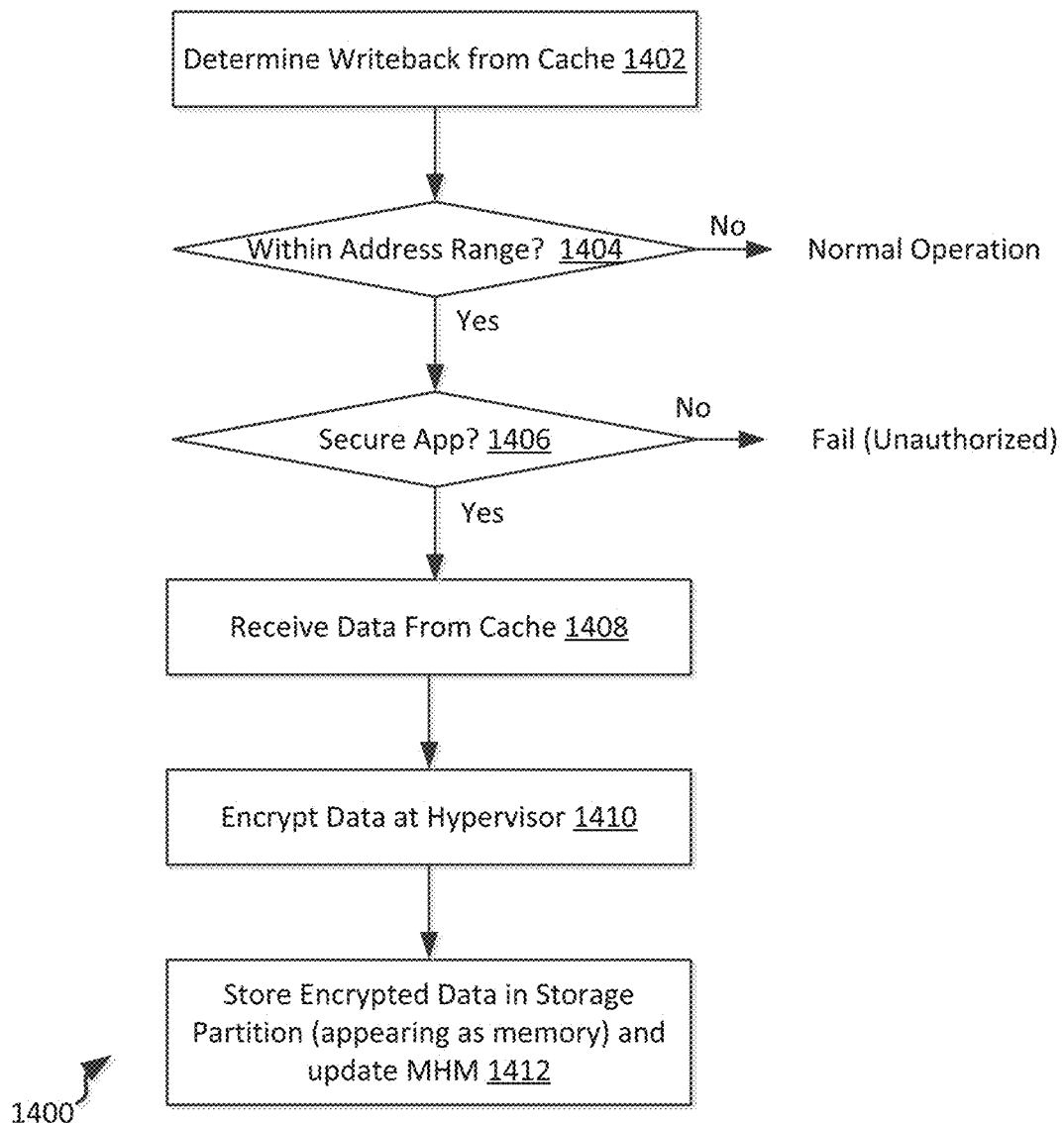
FIG. 18 illustrates a flowchart of a method for storing secured data in a hypervisor-enforced secured memory, according to an example embodiment.

Referring to FIGS. 16-18, additional details regarding read and write operations are described, for either accessing secured data at a memory location or writing data to a secured memory location. Such details are described in connection with operation of a hypervisor, for example in response to an API call to read and/or write data according to the various implementations of an API as discussed herein.

FIG. 16 illustrates a flowchart of a method 1200 for accessing secured data from a hypervisor-enforced secured memory, according to an example embodiment. The method 1200 generally begins upon receipt, at the hypervisor, of a memory request (e.g., a read operation) from an application in a partition (step 1202). The method 1200 includes validating the identity of the application (step 1204) to determine whether the application is allowed to read data from the specific location. If the application is not allowed to read data from that location, the method 1200 terminates. However, assuming validation of the application occurs successfully, a determination occurs whether the read operation is associated with a specific, secured address range (operation 1206). If the read operation is from a memory location outside a secured address range, the read operation is performed normally. However, if the read operation is associated with a memory location within the secured address range, the memory operation proceeds, and data is received, in an encrypted state, from memory at the designated address (step 1208).

In the embodiment shown, the hypervisor will decrypt the data, for example using a key specific to the application that is reading the data (step 1210), such as an application identity key associated with the application, retrieved from an application identity key database. Optionally, in some implementations, the hypervisor will also validate the decrypted data (step 1212), by comparing a hash of the data to a stored hash in a memory hash map, as noted above. Decrypted, and optionally validated, data can then be returned to the application (step 1214). This can include storing that decrypted data in a cache associated with a processor allocated to the requesting partition.

FIG. 17 illustrates a flowchart of an alternative method 1300 for accessing secured data from a hypervisor-enforced secured memory. The method 1300 can be performed, for example, if instead of being managed by the hypervisor, an API exposed from the hypervisor is accessible via a kernel level driver included in the encrypted memory partition 268. Generally, method 1300 includes installing a kernel-mode driver in the encrypted memory partition 268 (step 1302). The kernel-mode driver can be, for example, driver 297 of FIG. 6, above. Once installed, the kernel-mode driver need not be reinstalled each time method 1300 is performed.

Once the driver is installed, the remainder of method 1300 can be performed one or more times, as desired. The method 1300 includes exposing the API via the driver (step 1304), and receiving requests from one or more applications within the encrypted memory partition 268 that result in API calls (step 1306). The monitor can then retrieve data from memory and pass that data to the driver (step 1308); the driver can manage decryption keys, and will decrypt the retrieved data (step 1310). The driver can also perform a corresponding optional validation of decrypted data (step 1312), analogous to the validation of step 1212 of FIG. 16, above. The driver can then store the decrypted data in a cache and notify the application of its availability for use (step 1314).

By way of contrast to the method 1200 discussed above in connection with FIG. 16, the method 1300 allows the driver to perform the decryption operations instead of a monitor 251, which may be advantageous for performance reasons. In particular, in the case of write-once, read-many algorithms that may require a high number of decryption operations, this may avoid repeated VMEXIT operations triggered by app read requests, and would allow the kernel-mode driver to decrypt the memory without requiring an additional VMEXIT to have the monitor perform such decryption. Such device drivers are only be installable by system administrators, are not alterable, and would run in a privileged (e.g., ring 0) mode within the partition.

FIG. 18 illustrates a flowchart of a method 1400 for storing secured data in a hypervisor-enforced secured memory, according to an example embodiment. The method 1300 generally begins upon receipt, at the hypervisor, of a memory request (e.g., a write operation) from an application in a partition (step 1402). The method 1400 can be performed for example, in response to a write operation issued to an API published by a monitor of the hypervisor that hosts the partition including a secure application. The method includes a determination that the write operation is within a specific address range associated with encrypted memory (step 1404). If the address is not in a range associated with encrypted memory, operation proceeds as normal, since the address access is associated with unencrypted memory. However, if the address is within the range associated with encrypted memory, the hypervisor will also determine if the request is received from a secure application (step 1406). Such determinations can be performed, for example, based on an extended page table handler that manages operations based on the determination of a memory request addressing the specific memory range.

In the embodiment shown, the data can then be received from the application (e.g., from a cache from which the application executes (step 1408) and encrypted by the hypervisor (step 1410). The encryption can be performed, for example, using a secure application identity key stored in an application identity key database and associated with the application from which the data to be written to memory originated. The encrypted data can then be stored in memory at the designated location (step 1412). Optionally, the method 1400 also includes creating a hash based on the encrypted memory and updating a memory hash map. The memory hash map can be used to validate accessed data during subsequent read requests of that data, thereby preventing undetected compromise of that data by an unauthorized application.

Referring to FIGS. 11-18 generally, it is noted that the secure application and encrypted memory partition described herein provide a number of advantages over existing systems relative to security and validation of memory contents. Furthermore, because such security and validation is performed by a hypervisor, complex hosted security systems are not required. Furthermore because the hypervisor operates at a lowest level and controls access to memory from each of the partitions, this further limits the likelihood of compromise of data when such data is required to be validated.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A computing fabric comprising:
  one or more host computing platforms;
  a plurality of partitions instantiated across the one or more host computing platforms, each of the plurality of partitions allocated computing resources of the one or more host computing platforms;
  a hypervisor installed on the one or more host computing platforms and managing interactions among the plurality of partitions;
  wherein the plurality of partitions includes:
    one or more service partitions operable to manage hardware resources on behalf of a plurality of guest partitions representing one or more virtualized computing systems hosted on the one or more host computing platforms by the one or more service partitions, each guest partition comprising a respective submission queue and completion queue;

a persistent guest partition to which one or more storage devices are allocated, the persistent guest partition being a first guest partition from among the plurality of guest partitions and hosting a guest operating system therein, the persistent guest partition executing software loaded from a trusted storage location and executing from a nonvolatile memory, the software and including a virtual non-volatile memory controller interfaced to the one or more storage devices; and a storage service partition, comprising an I/O submission queue, an I/O completion queue, and a virtual non-volatile memory express layer managing said I/O submission queue and I/O completion queue, hosting one or more additional storage devices on a different host computing platform from the persistent guest partition, the storage service partition being a second guest partition from among the plurality of guest partitions;

wherein the persistent guest partition manages guest partition access to the one or more additional storage devices of the storage service partition via direct memory access operations between the virtual non-volatile memory controller and an I/O virtual machine associated with the storage service partition based on an address range allocated to the storage service partition, and to the one or more storage devices via direct memory access (DMA) operations performed via the virtual non-volatile memory controller based on an address range of the persistent guest partition;

the computing platform configured to:
receive a memory operation request from a second guest partition, the second partition being another one of the plurality of guest partitions, at the hypervisor, the memory request being routed from the submission queue of the second guest partition to the I/O submission queue of the storage service partition; and perform the memory operation by performing DMA operations via the virtual non-volatile memory controller and sending results of the memory operation from the I/O completion queue of the storage service partition to the completion queue of the second guest partition.

2. The computing fabric of claim 1, wherein the one or more storage devices comprises a plurality of solid state memory devices installed in the one or more host computing platforms.

3. The computing fabric of claim 1, wherein the persistent guest partition is located on the same host computing platform as the at least one other partition.

4. The computing fabric of claim 1, wherein the persistent guest partition is exposed to at least one other partition of the plurality of partitions by an application programming interface.

5. The computing fabric of claim 1, wherein the address range of the storage service partition is translated to storage locations of the plurality of solid state memory devices.

6. The computing fabric of claim 5, wherein the at least one other partition includes a driver managing memory accesses to the address range.

7. The computing fabric of claim 5, wherein an operating system installed on the at least one other partition includes a modified DMA mapping useable to manage memory accesses to the address range.

8. The computing fabric of claim 1, wherein the plurality of solid state memory devices comprises at least one solid state drive or at least one non-volatile memory DIMM.

9. The computing fabric of claim 1, wherein the at least one other partition includes a plurality of guest partitions having access to a common memory space of the storage service partition.

10. The computing fabric of claim 1, further comprising a second persistent guest partition, wherein the persistent guest partition resides on a first host computing platform of the one or more host computing platforms and the second persistent guest partition resides on a second host computing platform of the one or more host computing platforms, the first host computing platform and the second host computing platform being communicatively connected.

11. The computing fabric of claim 10, wherein the at least one other partition resides on the first host computing platform, and wherein access to a memory address within the at least one other partition that is mapped and allocated to the second persistent guest partition is managed by communication between the persistent guest partition and the second persistent guest partition.

12. The computing fabric of claim 10, wherein the storage service partition and the second storage partition comprise mirrored storage areas addressable at a common memory address range exposed to the at least one other partition.

13. The computing fabric of claim 1, wherein the storage service partition comprises a boot partition, and wherein the memory space comprises read-only memory from the perspective of the at least one other partition.

14. The computing fabric of claim 1, further comprising an I/O service partition different from the persistent guest partition, the I/O service partition being among the one or more service partitions and configured to perform I/O operations using physical computing resources on behalf of guest partitions included among the plurality of partitions.

15. A method of managing storage access via a hypervisor across a computing fabric, the method comprising:
instantiating a hypervisor across the computing fabric, the hypervisor including one or more service partitions operable to manage hardware resources on behalf of a plurality of guest partitions, each guest partition comprising a respective submission queue and completion queue;

allocating, via the hypervisor, a plurality of storage devices to a persistent guest partition at a host computing platform included among a plurality of host computing platforms in a computing fabric, the persistent guest partition being a first guest partition from among the plurality of guest partitions and hosting a guest operating system therein, the plurality of guest partitions representing one or more virtualized computing systems hosted by the plurality of host computing platforms and the one or more service partitions;

associating a memory range with the persistent guest partition, the memory range corresponding to memory space addressable by the persistent guest partition and representing nonvolatile storage locations of the persistent guest partition;

associating a second memory range with a storage partition hosting one or more additional storage devices on a different host computing platform from the persistent guest partition, the storage partition being a first guest partition from among the plurality of guest partitions and the storage partition comprising an I/O submission queue, an I/O completion queue, and a virtual nonvolatile memory express layer managing said I/O submission queue and I/O completion queue;

executing software loaded from a trusted storage location into memory within the memory space;

in response to an I/O operation associated with a memory address within the memory range, performing a direct memory access (DMA) operation to execute the I/O operation within the persistent guest partition via a virtual nonvolatile memory controller; and in response to a second I/O operation associated with a memory address within the second memory range, performing a remote direct memory access operation to execute the second I/O operation within the storage partition via the virtual nonvolatile memory controller;

in response to a memory operation request received at the hypervisor from a second guest partition, the second partition being another one of the plurality of guest partitions, routing the memory request from the submission queue of the second guest partition to the I/O submission queue of the storage partition; and performing the memory operation by performing DMA operations via the virtual nonvolatile memory controller and sending results of the memory operation from the I/O completion queue of the storage partition to the completion queue of the second guest partition.

16. The method of claim 15, further comprising exposing the plurality of storage devices to a guest partition within the computing fabric via an application programming interface.

17. The method of claim 16, further comprising instantiating the persistent guest partition as an isolated process operable by the guest partition and enforced by the hypervisor, wherein data exchanged by the guest partition and the persistent guest partition is communicated via a secure channel established by the hypervisor between the guest partition and the persistent guest partition.

* * * * *